US011028765B2

(12) United States Patent
Cola et al.

(10) Patent No.: US 11,028,765 B2
(45) Date of Patent: Jun. 8, 2021

(54) DUAL VOLUTE TURBOCHARGER AND SYSTEM INCLUDING THE SAME

(71) Applicant: BorgWarner Inc., Auburn Hills, MI (US)

(72) Inventors: Michael Daniel Cola, Fletcher, NC (US); Sascha Weiske, Weilerbach (DE); Mehul Sonigra, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/790,087

(22) Filed: Feb. 13, 2020

(65) Prior Publication Data

US 2020/0263600 A1     Aug. 20, 2020

Related U.S. Application Data

(60) Provisional application No. 62/962,321, filed on Jan. 17, 2020, provisional application No. 62/806,434, (Continued)

(51) Int. Cl.
*F02B 37/22*     (2006.01)
*F02D 23/00*     (2006.01)

(52) U.S. Cl.
CPC .............. *F02B 37/22* (2013.01); *F02D 23/00* (2013.01)

(58) Field of Classification Search
CPC ...... F02B 37/183; F02B 33/40; F02B 37/186; F02B 37/22; F02B 2037/122;
(Continued)

(56) References Cited

U.S. PATENT DOCUMENTS

| 3,423,926 A | 1/1969 | Nancarrow et al. |
| 6,250,079 B1 | 6/2001 | Zander et al. |

(Continued)

FOREIGN PATENT DOCUMENTS

| DE | 19826355 A1 | 12/1999 |
| DE | 10 2006 046 826 | 4/2008 |

(Continued)

OTHER PUBLICATIONS

English language abstract and machine-assisted English translation for DE 198 26 355 extracted from espacenet.com database on May 27, 2020, 8 pages.

(Continued)

*Primary Examiner* — Audrey K Bradley
*Assistant Examiner* — Edward Bushard
(74) *Attorney, Agent, or Firm* — Howard & Howard Attorneys PLLC

(57) ABSTRACT

A system includes a dual volute turbocharger and a controller. The dual volute turbocharger includes a turbine housing. The turbine housing includes a wall, a valve seat, and an interior surface defining a turbine housing interior, a first volute, a second volute, and a turbine housing outlet. The dual volute turbocharger also includes at least one valve member engageable with at least one of the valve seat and the wall of the turbine housing. The at least one valve member and the wall of the turbine housing collectively define a first cross-sectional flow area. The at least one valve member and the valve seat of the turbine housing collectively define a second cross-sectional flow area. The controller is adapted to control the at least one valve member to have an area ratio constant operating range according to a brake-specific fuel consumption of the internal combustion engine.

20 Claims, 16 Drawing Sheets

Related U.S. Application Data filed on Feb. 15, 2019, provisional application No. 62/806,396, filed on Feb. 15, 2019.

(58) Field of Classification Search
CPC ............... F02B 37/025; F02D 41/1448; F02D 41/1446; F02D 41/0007; F02D 23/00; F02D 41/1445; F02D 35/0023; F01D 17/04; F01D 17/08; F01D 17/105; F01D 17/145; F01D 9/026; F05D 2270/301; F05D 2270/303; F05D 2270/20; F05D 2270/07; F05D 2240/14; F05D 2220/40; F16K 11/161; F16K 37/005; F16K 37/0041

See application file for complete search history.

(56) References Cited

U.S. PATENT DOCUMENTS

| | | |
|---|---|---|
| 6,672,061 B2 | 1/2004 | Schmid et al. |
| 6,969,048 B2 | 11/2005 | Colic et al. |
| 7,934,379 B2 | 5/2011 | Kuspert et al. |
| 8,499,557 B2 | 8/2013 | Grabowska |
| 9,359,939 B2 | 6/2016 | Kindl et al. |
| 9,556,786 B2 | 1/2017 | Marques et al. |
| 9,810,143 B2 | 11/2017 | McConville et al. |
| 10,006,342 B2 | 6/2018 | Smiljanovski et al. |
| 10,030,518 B2 | 7/2018 | Lummer et al. |
| 10,119,549 B2 | 11/2018 | Tschirschke |
| 2004/0244373 A1 | 12/2004 | Frankenstein et al. |
| 2007/0119170 A1 | 5/2007 | Masson et al. |
| 2012/0060494 A1 | 3/2012 | Sato et al. |
| 2015/0292394 A1 | 10/2015 | Uibelhoer et al. |
| 2017/0234435 A1 | 8/2017 | Hermann et al. |
| 2017/0241329 A1 | 8/2017 | Uehane et al. |
| 2018/0328217 A1 | 11/2018 | Walkingshaw et al. |
| 2018/0328268 A1 | 11/2018 | Babak |
| 2019/0301355 A1 | 10/2019 | Walkingshaw et al. |
| 2020/0141309 A1 | 5/2020 | Reif et al. |

FOREIGN PATENT DOCUMENTS

| | | |
|---|---|---|
| DE | 102006046826 A1 | 4/2008 |
| DE | 10 2010 008 411 | 8/2011 |
| DE | 102010008411 A1 | 8/2011 |
| DE | 10 2013 002 894 | 9/2014 |
| DE | 102013002894 A1 | 9/2014 |
| DE | 11 2013 002 306 | 2/2015 |
| DE | 112013002306 T5 | 2/2015 |
| DE | 10 2015 011 256 | 3/2016 |
| DE | 102015011256 A1 | 3/2016 |
| DE | 102016100329 A1 | 7/2016 |
| DE | 10 2015 209 044 | 11/2016 |
| DE | 102015209044 A1 | 11/2016 |
| DE | 10 2015 122 351 | 6/2017 |
| DE | 102015122351 A1 | 6/2017 |
| DE | 10 2016 103 145 | 8/2017 |
| DE | 102016103145 A1 | 8/2017 |
| DE | 20 2018 101 705 | 4/2018 |
| DE | 202018101705 U1 | 4/2018 |
| DE | 202018104140 U1 | 7/2018 |
| EP | 1 939 427 | 2/2012 |
| EP | 1939427 B1 | 2/2012 |
| EP | 2444626 A1 | 4/2012 |
| EP | 2708717 B1 | 9/2015 |
| EP | 2 803 838 | 9/2016 |
| EP | 2803838 B1 | 9/2016 |
| JP | 2009024584 A | 2/2009 |
| WO | 2007060831 A1 | 5/2007 |
| WO | 2011101005 A1 | 8/2011 |
| WO | WO 2011/101005 | 8/2011 |
| WO | 2016094268 A1 | 6/2016 |
| WO | 2017102040 A1 | 6/2017 |
| WO | WO 2017/102040 | 6/2017 |

OTHER PUBLICATIONS

Machine-assisted English language abstract for DE 20 2018 104 140 extracted from espacenet.com database on Jun. 24, 2020, 3 pages.
English language abstract and machine-assisted English translation for JP 2009-024584 extracted from espacenet.com database on May 20, 2020, 15 pages.
U.S. Appl. No. 16/788,891, filed Feb. 12, 2020, 35 pages.
U.S. Appl. No. 16/788,927, filed Feb. 12, 2020, 34 pages.
U.S. Appl. No. 62/806,434, filed Feb. 15, 2019, 41 pages.
U.S. Appl. No. 62/806,396, filed Feb. 15, 2019, 43 pages.
English language abstract and machine-assisted English translation for DE 10 2006 046 826 extracted from espacenet.com database on Feb. 26, 2020, 7 pages.
English language abstract and machine-assisted English translation for DE 10 2010 008 411 extracted from espacenet.com database on Feb. 26, 2020, 9 pages.
English language abstract and machine-assisted English translation for DE 10 2013 002 894 extracted from espacenet.com database on Feb. 26, 2020, 8 pages.
English language abstract for DE 11 2013 002 306 extracted from espacenet.com database on Feb. 26, 2020, 1 page.
English language abstract and machine-assisted English translation for DE 10 2015 011 256 extracted from espacenet.com database on Feb. 26, 2020, 13 pages.
English language abstract for DE 10 2015 122 351 extracted from espacenet.com database on Feb. 26, 2020, 2 pages.
English language abstract and machine-assisted English translation for DE 10 2016 103 145 extracted from espacenet.com database on Feb. 26, 2020, 14 pages.
English language abstract and machine-assisted English translation for DE 10 2015 209 044 extracted from espacenet.com database on Feb. 26, 2020, 11 pages.
English language abstract for DE 20 2018 101 705 extracted from espacenet.com database on Feb. 26, 2020, 2 pages.
English language abstract and machine-assisted English translation for EP 1 939 427 extracted from espacenet.com database on Feb. 26, 2020, 13 pages.
English language abstract and machine-assisted English translation for EP 2 803 838 extracted from espacenet.com database on Feb. 26, 2020, 11 pages.
English language abstract and machine-assisted English translation for WO 2011/101005 extracted from espacenet.com database on Feb. 26, 2020, 6 pages.
English language abstract and machine-assisted English translation for WO 2017/102040 extracted from espacenet.com database on Feb. 26, 2020, 6 pages.
Machine-assisted English language abstract for DE 10 2016 100 329 A1 extracted from espacenet.com database on May 6, 2021, 2 pages.
Borgwarner, "News Relsease: BorgWarner Introduces Dual Volute Turbocharger for Gasoline Engines", https://cdn.borgwarner.com/docs/default-sourrce/press-release-downloads/borgwarner-introduces-dual-volute-turbocharger-for-gasoline-enginesfba3d8c4e9169aab321ff0400c8bala.pdf?sfvrsn=4232b63c_2, Sep. 6, 2018, 9 pages.
Borgwarner, "Performance Turbocharger Catalog", http://www.turbotekniikka.fi/PerformanceTurbochargerCatalog.pdf, Jan. 1, 2011, 12 pages.

DUAL VOLUTE TURBOCHARGER AND SYSTEM INCLUDING THE SAME

CROSS-REFERENCE TO RELATED APPLICATIONS

The subject patent application claims priority to and all the benefits of U.S. Provisional Patent Application No. 62/806,396 filed on Feb. 15, 2019, U.S. Provisional Patent Application No. 62/806,434 filed on Feb. 15, 2019, and U.S. Provisional Patent Application No. 62/962,321 filed on Jan. 17, 2020, the disclosures of which are herein incorporated by reference in their entirety.

BACKGROUND OF THE INVENTION

1. Field of the Invention

The present invention generally relates to a system including a dual volute turbocharger and a controller, with the dual volute turbocharger including at least one valve member, and with the controller adapted to control the at least one valve member.

2. Description of the Related Art

Dual volute turbochargers receive exhaust gas from an internal combustion engine and deliver compressed air to the internal combustion engine. Dual volute turbochargers are used to increase power output of the internal combustion engine, lower fuel consumption of the internal combustion engine, and reduce emissions produced by the internal combustion engine. Delivery of compressed air to the internal combustion engine by the dual volute turbocharger allows the internal combustion engine to be smaller, yet able to develop the same or similar amount of horsepower as larger, naturally aspirated internal combustion engines. Having a smaller internal combustion engine for use in a vehicle reduces the mass and aerodynamic frontal area of the vehicle, which helps reduce fuel consumption of the internal combustion engine and improve fuel economy of the vehicle.

Dual volute turbochargers include a turbine housing. The turbine housing has an interior surface defining a turbine housing interior, a first volute, a second volute, and a turbine housing outlet. The first and second volutes are each adapted for fluid communication with the internal combustion engine and the turbine housing interior for delivering exhaust gas from the internal combustion engine to the turbine housing interior. The turbine housing also includes a wall separating the first and second volutes and a valve seat.

Dual turbochargers also include a valve member engageable with at least one of the valve seat and the wall of the turbine housing for controlling exhaust gas flow from the first and second volutes to the turbine housing interior. The valve member is movable between a closed position and an open position. In the closed position the valve member restricts exhaust gas from flowing between the first and second volutes. In the open position the valve member allows exhaust gas from the first and second volutes to bypass the turbine housing interior.

In recent years, there has been a desire to increase the efficiency and overall performance of dual volute turbochargers. To help increase the efficiency and performance of the turbocharger, there has been a desire to improve control of the valve member of the dual volute turbocharger. Conventional controllers for controlling the valve member fail to balance a desire to efficiently utilize pulse energy associated with exhaust gas flowing through one of the first and second volutes with a desire to reduce backpressure on the internal combustion engine. Moreover, conventional controllers for controlling the valve member fail to optimize a brake-specific fuel consumption (BSFC) of the internal combustion engine.

As such, there remains a need to provide an improved dual volute turbocharger.

SUMMARY OF THE INVENTION AND ADVANTAGES

A system includes a dual volute turbocharger and a controller. The dual volute turbocharger delivers compressed air to an internal combustion engine and receives exhaust gas from the internal combustion engine. The dual volute turbocharger includes a turbine housing. The turbine housing includes an interior surface defining a turbine housing interior, a first volute, a second volute, and a turbine housing outlet. The turbine housing interior is adapted to receive a turbine wheel. The first and second volutes are each adapted for fluid communication with the internal combustion engine and the turbine housing interior for delivering exhaust gas from the internal combustion engine to the turbine housing interior. The turbine housing outlet is in fluid communication with the turbine housing interior for discharging exhaust gas from the turbine housing interior. The turbine housing also includes a wall separating the first volute from the second volute. The turbine housing further includes a valve seat.

The dual volute turbocharger also further includes at least one valve member for controlling exhaust gas flow from the first and second volutes to the turbine housing interior. The at least one valve member is engageable with at least one of the valve seat and the wall of the turbine housing. The at least one valve member and the wall of the turbine housing collectively define a first cross-sectional flow area. The at least one valve member and the valve seat of the turbine housing collectively define a second cross-sectional flow area.

The controller is adapted to control the at least one valve member to have an area ratio constant ($C_{AR}$) operating range according to a brake-specific fuel consumption (BSFC) of the internal combustion engine. The $C_{AR}$ is defined by the equation: $C_{AR}$=first cross-sectional flow area/($\rho_{power}$*second cross-sectional flow area), where $\rho_{power}$ is the power density of the internal combustion engine in kW/L.

Accordingly, when the controller controls the at least one valve member to have a $C_{AR}$ operating range according to the BSFC of the internal combustion engine, the dual volute turbocharger efficiently utilizes pulse energy associated with exhaust gas flowing through one of the first and second volutes. The dual volute turbocharger also reduces backpressure on the internal combustion engine, thereby reducing the risk of damage to the internal combustion engine during operation of the dual volute turbocharger. Moreover, dual volute turbocharger optimizes the BSFC of the internal combustion engine. This optimization of the BSFC lowers fuel consumption of the internal combustion engine during operation of the internal combustion engine and the dual volute turbocharger.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
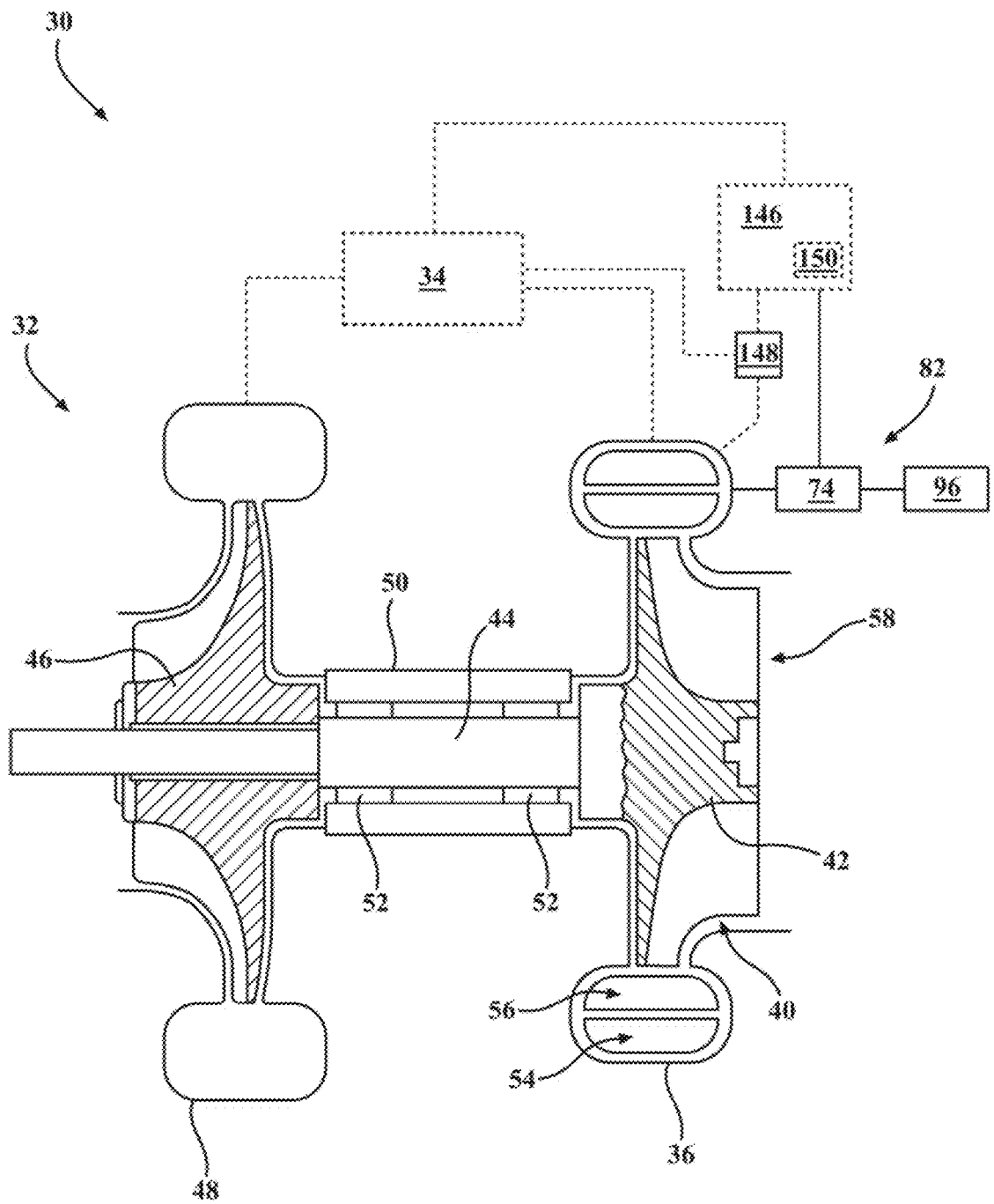
FIG. 1 is a schematic representation of a dual volute turbocharger.
Figure 2:
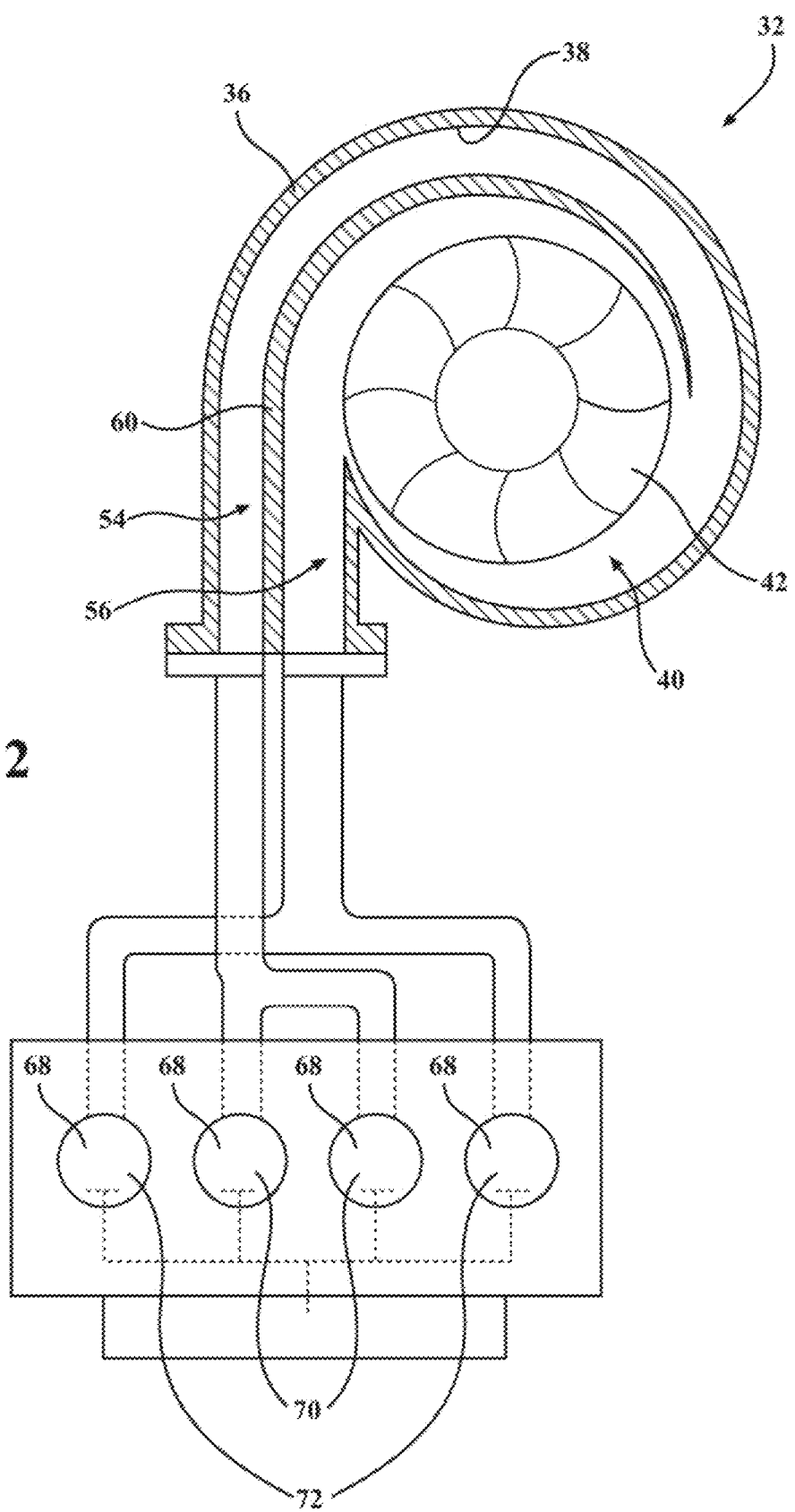
FIG. 2 is a schematic representation of a turbine housing of the dual volute turbocharger adapted for fluid communication with an internal combustion engine.

With reference to the Figures, wherein like numerals indicate like parts throughout the several views, a schematic representation of a system 30 is shown in FIG. 1. The system 30 includes a dual volute turbocharger 32 for receiving exhaust gas from an internal combustion engine 34 and delivering compressed air to the internal combustion engine 34. Although not required, the dual volute turbocharger 32 is typically used in passenger and commercial automotive applications. However, it is to be appreciated that the dual volute turbocharger 32 may be used in non-automotive applications such as heavy equipment applications, non-automotive diesel engine applications, non-automotive motor applications, and the like. As shown in FIGS. 1-4, the dual volute turbocharger 32 includes a turbine housing 36. As shown in FIG. 2, the turbine housing 36 includes an interior surface 38 defining a turbine housing interior 40, as described in further detail below. The turbine housing interior 40 is adapted to receive a turbine wheel 42.

With reference again to FIG. 1, the dual volute turbocharger 32 typically includes a turbocharger shaft 44, a compressor wheel 46, a compressor housing 48, and a bearing housing 50. During operation of the dual volute turbocharger 32, the turbine wheel 42 receives exhaust gas from the internal combustion engine 34 which causes the turbine wheel 42 to rotate. When present, the turbocharger shaft 44 is coupled to and rotatable by the turbine wheel 42. When present, the compressor wheel 46 is disposed in the compressor housing 48, is coupled to the turbocharger shaft 44, and is rotatable by the turbocharger shaft 44 for delivering compressed air to the internal combustion engine 34. The bearing housing 50 extends about the turbocharger shaft 44 between the turbine wheel 42 and the compressor wheel 46. The dual volute turbocharger 32 also typically includes bearings 52 disposed about the turbocharger shaft 44 and in the bearing housing 50 for rotatably supporting the turbocharger shaft 44.

Figure 3:
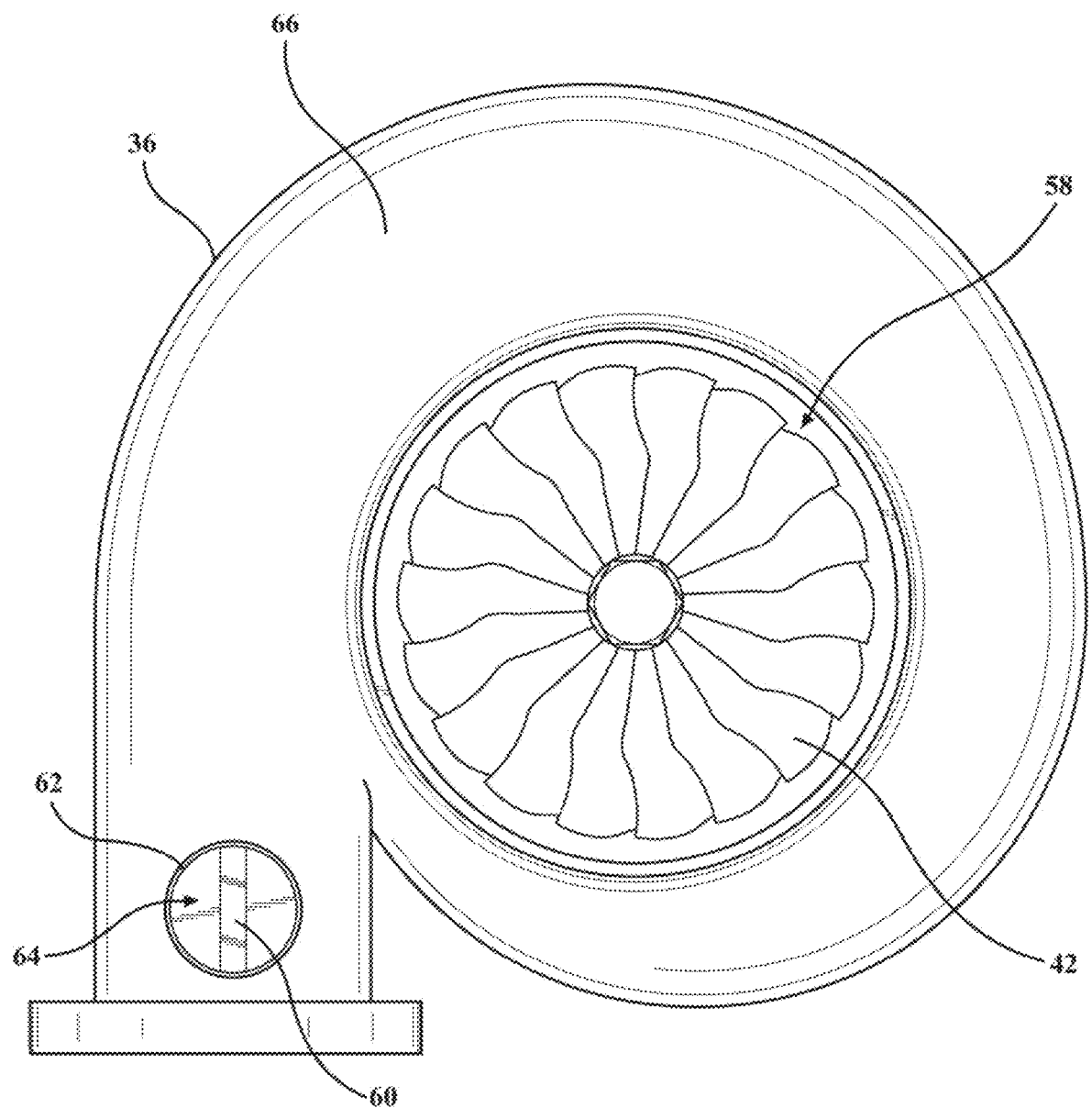
FIG. 3 is a top view of the turbine housing according to one embodiment, with the turbine housing including a wall and an exterior surface having a valve seat, and with the wall and the valve seat collectively defining a valve cavity.
Figure 4:
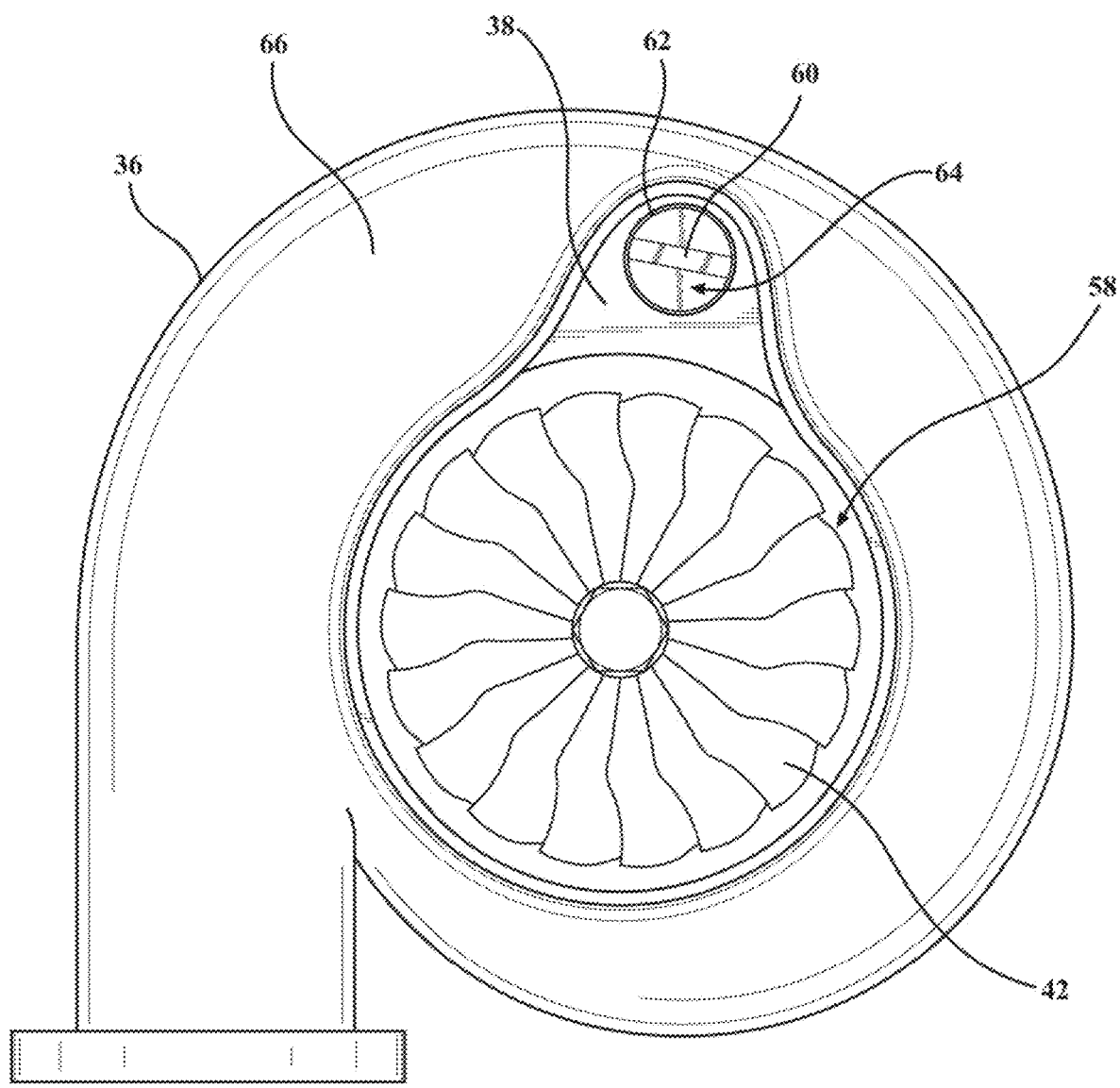
FIG. 4 is a top view of the turbine housing according to another embodiment, with the turbine housing including the wall and an interior surface having the valve seat, and with the wall and the valve seat collectively defining the valve cavity.
Figure 5:
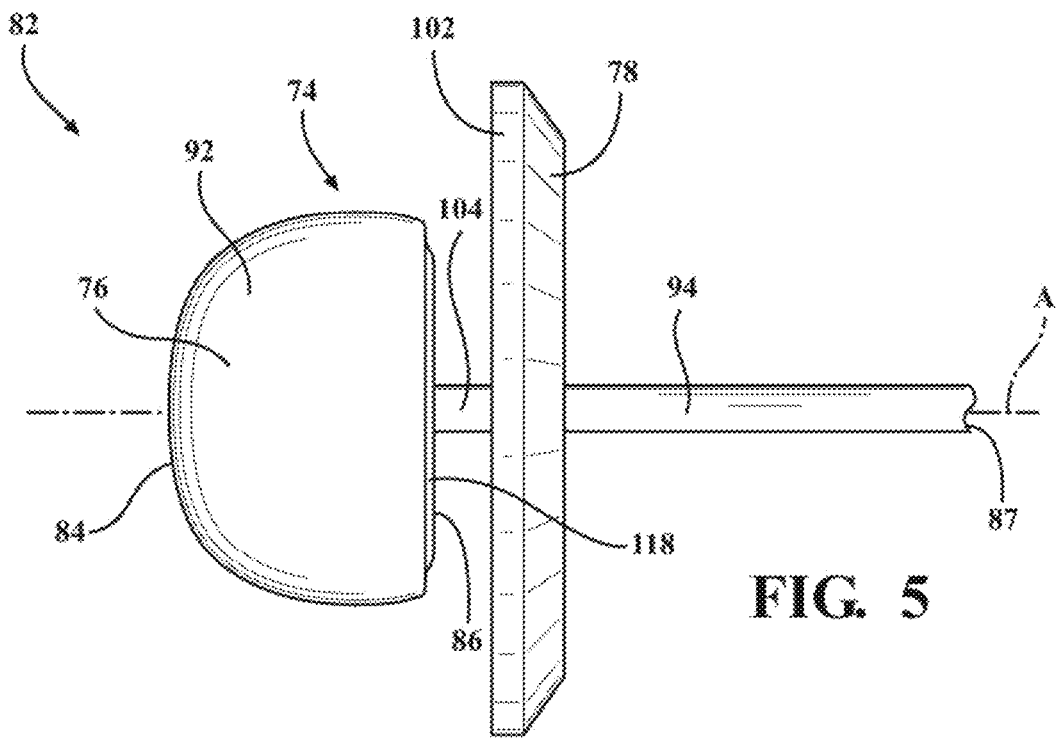
FIG. 5 is a side view of a valve assembly according to one embodiment, with the valve assembly including a first valve member that is engageable with the wall of the turbine housing and a second valve member that is engageable with the valve seat of the exterior surface of the turbine housing.

As described above, the turbine housing 36 includes the interior surface 38 defining the turbine housing interior 40, as shown in FIG. 2. The turbine housing interior 40 is adapted to receive the turbine wheel 42. The interior surface 38 defines a first volute 54, and a second volute 56. The first and second volutes 54, 56 are each in fluid communication with the internal combustion engine 34 and the turbine housing interior 40 for delivering exhaust gas from the internal combustion engine 34 to the turbine housing interior 40. As shown in FIGS. 1, 3 and 4, the interior surface 38 also defines a turbine housing outlet 58. The turbine housing outlet 58 is in fluid communication with the turbine housing interior 40 for discharging exhaust gas from the turbine housing interior 40. With reference again to FIG. 2, the turbine housing 36 also includes a wall 60 separating the first volute 54 from the second volute 56. The turbine housing 36 may be comprised of any suitable metal or plastic. Typically, the turbine housing 36 is comprised of metal.

As shown in FIGS. 3 and 4, the turbine housing 36 further includes a valve seat 62. Typically, the valve seat 62 has as circular configuration, as shown in FIGS. 3 and 4. However, it is to be appreciated that the valve seat 62 may have any suitable configuration. In some embodiments, the wall 60 and the valve seat 62 collectively define a valve cavity 64. The valve seat 62 may be included on an exterior surface 66 of the turbine housing 36, as shown in FIG. 3. Alternatively, the valve seat 62 may be included on the interior surface 38 of the turbine housing 36, as shown in FIG. 4.

With reference again to FIG. 2, the internal combustion engine 34 includes a plurality of cylinders 68. In the illustrated embodiment, the internal combustion engine 34 includes four cylinders 68. However, it is to be appreciated that the internal combustion engine 34 may include any number of cylinders 68. For example, the internal combustion engine 34 may include two cylinders 68, four cylinders 68, six cylinders 68, eight cylinders 68, or more cylinders 68. The internal combustion engine 34 may have a V-engine configuration, a flat/boxer engine configuration, a W-engine configuration, an inline engine configuration, and the like. In the illustrated embodiment, the internal combustion engine 34 has an inline engine configuration. The internal combustion engine 34 includes a first group of cylinders 70 and a second group of cylinders 72. The first and second groups of cylinders 70, 72 each include half of the cylinders 68 that are included in the internal combustion engine 34. For example, when the internal combustion engine 34 includes four cylinders 68 as shown in FIG. 2, the first group of cylinders 70 includes two of the cylinders 68 and the second group of cylinders 72 includes the other two of the cylinders 68. The first and second groups of cylinders 70, 72 produce exhaust gas in a series of pulses corresponding to an exhaust stroke of each of the first and second groups of cylinders 70, 72. Timing of the exhaust stroke of the first group of cylinders 70 is different from timing of the exhaust stroke of the second group of cylinders 72 such that the first and second groups of cylinders 70, 72 alternate pulses of exhaust gas.

With continued reference to FIG. 2, typically the first group of cylinders 70 are in fluid communication with the first volute 54 and the second group of cylinders 72 are in communication with the second volute 56. In this manner, pulses of exhaust gas from the first and second groups of cylinders 70, 72 flow through the first and second volutes 54, 56, respectively, and to the turbine housing interior 40, where the pulses of exhaust gas rotate the turbine wheel 42.

Figure 10:
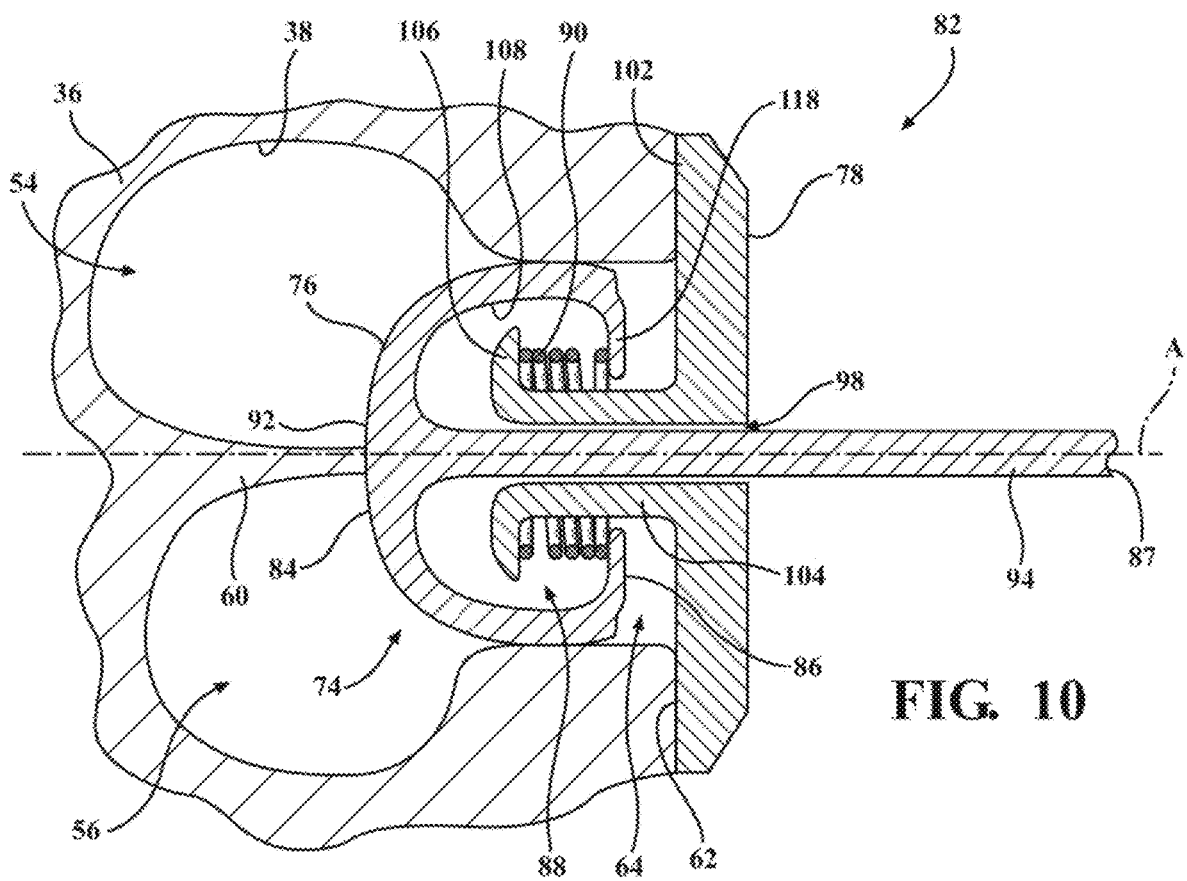
FIG. 10 is a cross-sectional view of the valve assembly of FIG. 5 and the turbine housing of FIG. 3, with the first valve member in a first position where the first valve member is disposed in the valve cavity and adjacent the wall of the turbine housing, and with the second valve member in a closed position where a base of the second valve member is engaged with the valve seat of the turbine housing.
Figure 11:
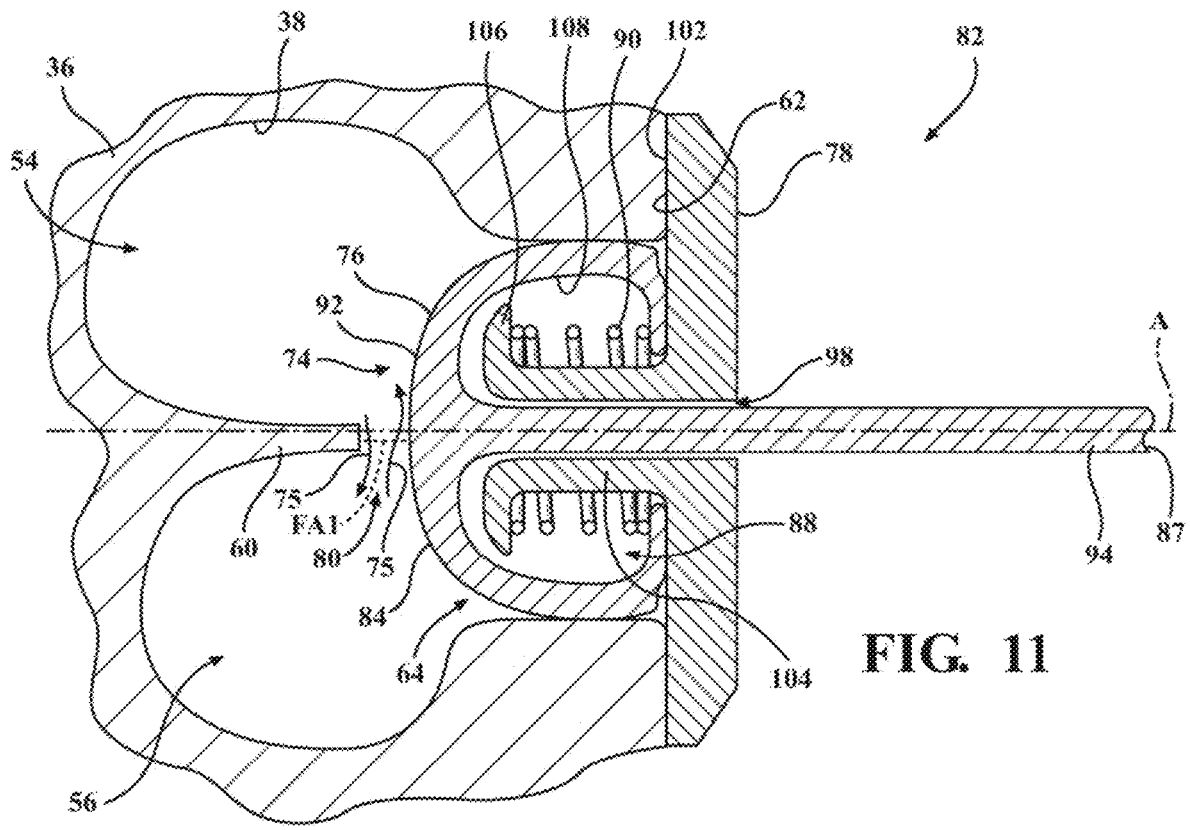
FIG. 11 is a cross-sectional view of the valve assembly of FIG. 5 and the turbine housing of FIG. 3, with the first valve member in a second position where the first valve member is disposed in the valve cavity and spaced from the wall of the turbine housing, and with the second valve member in the closed position.
Figure 12:
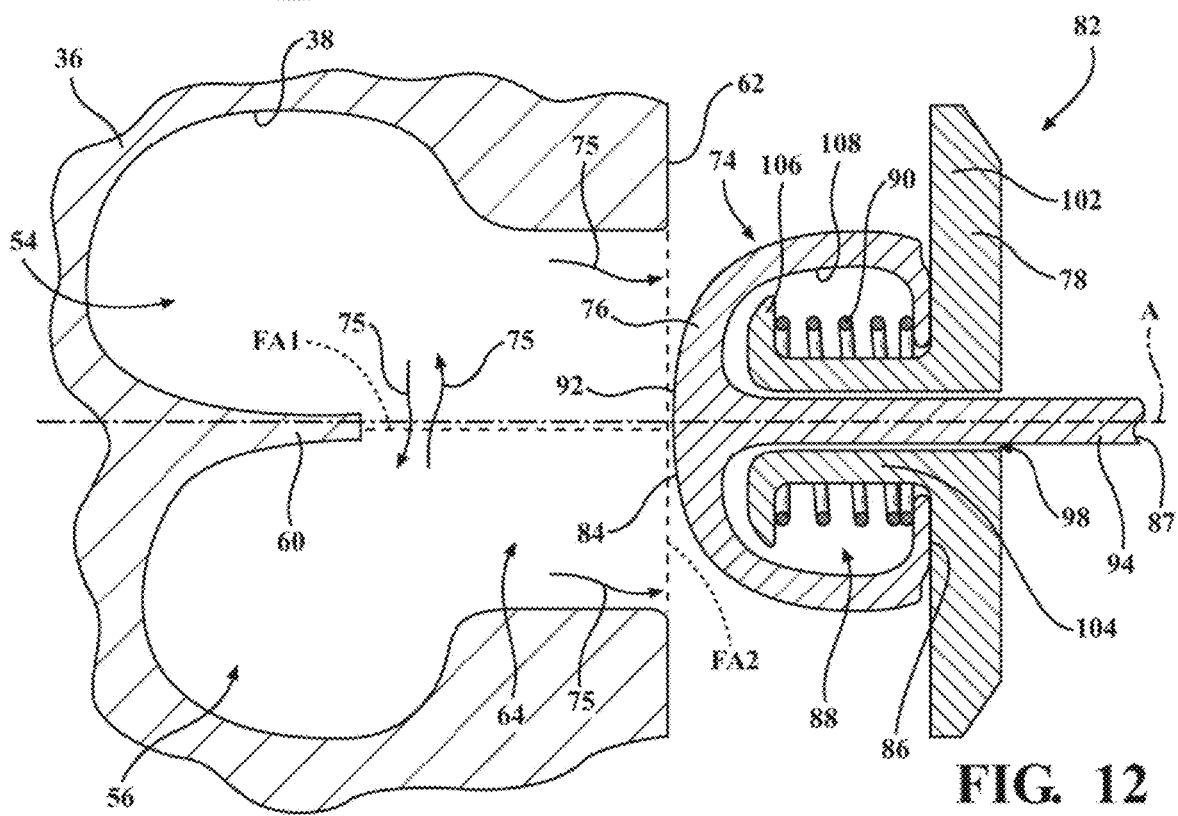
FIG. 12 is a cross-sectional view of the valve assembly of FIG. 5 and the turbine housing of FIG. 3, with the first valve member in a third position where the first valve member is disposed outside of the valve cavity, and with the second valve member in an open position where the base of the second valve member is disengaged with the valve seat.

With particular reference to FIGS. 5-8, the dual volute turbocharger 32 also includes at least one valve member 74 for controlling exhaust gas flow from the first and second volutes 54, 56 to the turbine housing interior 40. It is to be appreciated that the at least one valve member 74 may have any suitable configuration, such as the configuration shown throughout the Figures, and others not specifically shown in the Figures, such as embodiments of the at least one valve member 74 being free of a biasing member. The at least one valve member 74 is engageable with at least one of the wall 60 and the valve seat 62 of the turbine housing 36. The at least one valve member 74 and the wall 60 of the turbine housing 36 collectively define a first cross-sectional flow area FA1, as illustrated in FIGS. 11 and 12. The first cross-sectional flow area FA1 represents a cross-sectional area in which the exhaust gas is allowed to flow between the first and second volutes 54, 56, as illustrated by exhaust flow arrows 75. As such, if the first cross-sectional flow area FA1 is zero, exhaust gas is prevented by the at least one valve member 74 from flowing between the first and second volutes 54, 56, as shown in FIG. 10. Moreover, if the first cross-sectional flow area FA1 is non-zero (i.e., greater than zero), although exhaust gas may be restricted by the at least one valve member 74 from flowing between the first and second volutes 54, 56, exhaust gas is able to flow between the first and second volutes 54, 56, as shown in FIG. 11. The at least one valve member 74 and the valve seat 62 of the turbine housing 36 collectively define a second cross-sectional flow area FA2. The second cross-sectional flow area FA2 represents a cross-sectional area in which the exhaust gas is allowed to bypass the turbine housing interior 40, as illustrated by exhaust flow arrows 75. As such, if the second cross-sectional flow area FA2 is zero, exhaust gas is prevented by the at least one valve member 74 from bypassing the turbine housing interior 40, as shown in FIGS. 10 and 11. Moreover, if the second cross-sectional flow area is non-zero (i.e., greater than zero), although exhaust gas may be restricted by the at least one valve member 74 from bypassing the turbine housing interior 40, exhaust gas is able to bypass the turbine housing interior 40, as shown in FIG. 12.

With reference to FIGS. 5-12, the at least one valve member 74 may be further defined as a first valve member 76 and a second valve member 78. With continued reference to FIGS. 10-12, the wall 60 and the valve seat 62 may collectively define the valve cavity 64, the first valve member 76 and the wall 60 of the turbine housing 36 may collectively define the first cross-sectional flow area FA1, and the valve seat 62 of the turbine housing 36 and at least one of the first and second valve members 76, 78 collectively define the second cross-sectional flow area FA2.

The dual volute turbocharger 32 may include a valve assembly 82 for controlling exhaust gas flow from the first and second volutes 54, 56 to the turbine housing interior 40. When present, the valve assembly 82 includes the first valve member 76 engageable with the wall 60 of the turbine housing 36 and disposed about and extending along an axis A between a first end 84 adapted to be proximal to the wall 60 of the turbine housing 36 and a second end 86 spaced from the first end 84 and adapted to be distal to the wall 60 of the turbine housing 36. In such embodiments, the first valve member 76 is movable between a first position, as shown in FIG. 10, a second position, as shown in FIG. 11, and a third position, as shown in FIG. 12.

The valve assembly 82 may be operably coupled to the dual volute turbocharger 32 in any suitable manner such that the valve assembly 82 is able to control exhaust gas flow from the first and second volutes 54, 56 to the turbine housing interior 40. For example, the valve assembly 82 may be operable coupled to the turbine housing 36, the compressor housing 48, and/or the bearing housing 50.

When in the first position, as shown in FIG. 10, the first valve member 76 is disposed in the valve cavity 64 and adjacent the wall 60 of the turbine housing 36 for restricting exhaust gas from flowing between the first and second volutes 54, 56. It is to be appreciated that the first valve member 76 may not be engaged with the wall 60 in the first position, and instead the first valve member 76 may be in close proximity to the wall 60 for restricting exhaust gas from flowing between the first and second volutes 54, 56. Accordingly, when the first valve member 76 is in the first position, pulses of exhaust gas from the first group of cylinders 70 flow through the first volute 54 to the turbine housing interior 40 and are restricted from flowing to the second volute 56 because the first valve member 76 is adjacent the wall 60 of the turbine housing 36. Similarly, pulses of exhaust gas from the second group of cylinders 72 flow through the second volute 56 to the turbine housing interior 40 and are restricted flowing to first volute 54 because the first valve member 76 is adjacent the wall 60 of the turbine housing 36.

When in the second position, as shown in FIG. 11, the first valve member 76 is disposed in the valve cavity 64 and spaced from the wall 60 of the turbine housing 36 for allowing exhaust gas to flow between the first and second volutes 54, 56. Specifically, exhaust gas can flow between the first and second volutes 54, 56 through a gap 80 between the first valve member 76 and the wall 60 because the first valve member 76 is spaced from the wall 60. Accordingly, when the first valve member 76 is in the second position, pulses of exhaust gas from the first group of cylinders 70 flow through the first volute 54 to the turbine housing interior 40 and also through the first volute 54 to the second volute 56 and then to the turbine housing interior 40. Similarly, pulses of exhaust gas from the second group of cylinders 72 flow through the first volute 54 to the turbine housing interior 40 and also through the first volute 54 to the second volute 56 and then to the turbine housing interior 40.

When in the third position, as shown in FIG. 12, the first valve member 76 is disposed outside of the valve cavity 64 for allowing exhaust gas from the first and second volutes 54, 56 to bypass the turbine housing interior. Specifically, exhaust gas can flow from both of the first and second volutes 54, 56 through the valve cavity 64 to an environment outside of the turbine housing 36, bypassing the turbine housing interior 40, because the first valve member 76 is not disposed in the valve cavity 64. Accordingly, when the first valve member 76 is in the third position, pulses of exhaust gas from the first and second groups of cylinders 70, 72 flow through the first and second volutes 54, 56, respectively, and through the valve cavity 64 to an environment outside of the turbine housing 36, thereby bypassing the turbine housing interior 40.

With continued reference to FIGS. 4-12, the second valve member 78 may be engageable with the valve seat 62 and coupled to the first valve member 76. When present, the second valve member 78 is movable between a first position, as shown in FIGS. 10 and 11, and a second position, as shown in FIG. 12. The first position of the second valve member 78 may be referred to as a closed position. When in the first position, the second valve member 78 is engaged with the valve seat 62 of the turbine housing 36 for restricting exhaust gas from the first and second volutes 54, 56 from bypassing the turbine housing interior 40. The second position of the second valve member 78 may be referred to as an open position. When in the second position, the second valve member 78 is disengaged with the valve seat 62 of the turbine housing 36 for allowing exhaust gas from the first and second volutes 54, 56 to bypass the turbine housing interior 40. The first and second positions of the second valve member 78 are described in further detail below.

The first valve member 76 may define a valve interior 88 between the first and second ends 84, 86. When the first valve member 76 defines the valve interior 88, the valve assembly 82 typically includes a biasing member 90 disposed in the valve interior 88. When present, the biasing member 90 is configured to bias the first valve member 76 into one of the first and second positions when the second valve member 78 is in the first position. The biasing member 90 may be any suitable biasing member, such as a cupped spring, curved spring, wave spring, or a coil spring.

Typically, the first valve member 76 has an outer contour 92 configured to reduce wear of the valve assembly 82. For example, the outer contour 92 of the first valve member 76 may be cup-shaped to reduce wear of the valve assembly 82. Although not required, the outer contour 92 may abut the turbine housing 36 when the first valve member 76 is in the first and second positions, as shown in FIGS. 10 and 11.

The valve assembly 82 may also include a valve shaft 94 coupled to at least one of the first and second valve members 76, 78 for moving the first valve member 76 between the first, second, and third positions and the second valve member 78 between the first and second positions. The valve assembly 82 may include an actuator 96, as shown in FIG. 1, operably coupled to the valve shaft 94 for moving the valve shaft 94 to move the first valve member 76 between the first, second, and third positions and the second valve member 78 between the first and second positions. The actuator 96 may be any suitable actuator, such as an electric actuator or a pneumatic actuator. As shown in FIGS. 7, 8, and 10-12, the valve shaft 94 may be partially disposed in the valve interior 88. The valve shaft 94 is coupled to and extends from the first end 84 of the first valve member 76. The valve shaft 94 extends from the first end 84 of the first valve member 76 in a direction of the second end 86 of the first valve member 76 to a free end 87 of the valve shaft 94 that is not disposed in the valve interior 88. In the illustrated embodiment, the valve shaft 94 is integral with the first end 84 of the first valve member 76. However, it is to be appreciated that the valve shaft 94 may not be integral with the first end 84 of the first valve member 76. Instead, the valve shaft 94 may be coupled to the first end 84 of the first valve member 76 in any suitable manner, such as via fasteners, weldments, riveting, etc. Typically, the valve shaft 94 extends from the first end 84 of the first valve member 76 along the axis A and is movable along the axis A for moving the first valve member 76 between the first, second, and third positions. Although not required, typically the valve shaft 94 has a cylindrical configuration. However, it is to be appreciated that the valve shaft 94 may have any configuration suitable for moving the first valve member 76 between the first, second, and third positions, such as a rectangular prism configuration. The valve shaft 94 may be comprised of any suitable metal or plastic.

Figure 9:
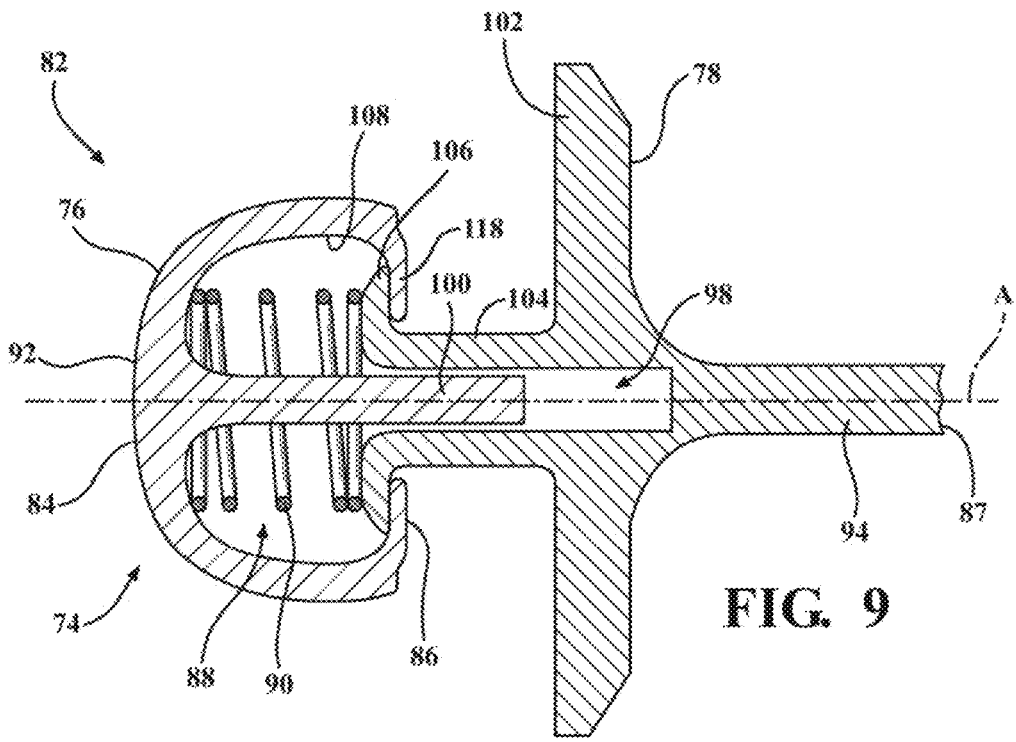
FIG. 9 is a cross-sectional view of the valve assembly according to another embodiment.
Figure 21:
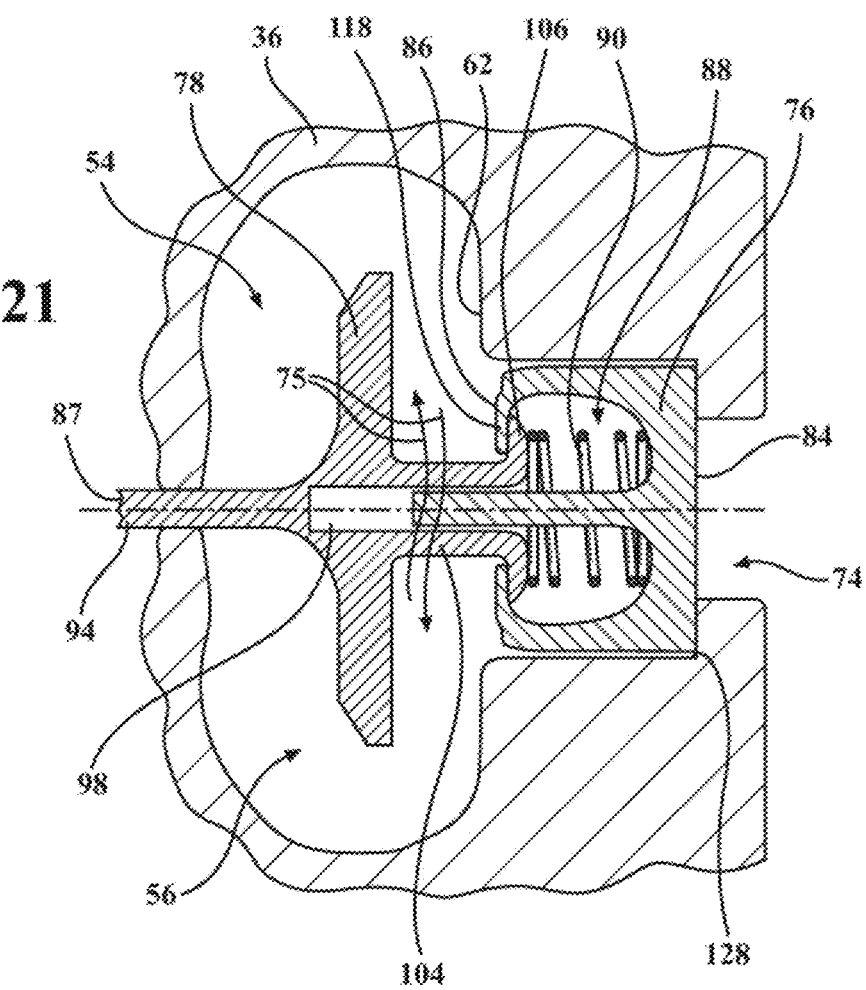
FIG. 21 is a cross-sectional view of the valve assembly according to another embodiment.

With reference to FIGS. 9 and 21, the valve shaft 94 may define a channel 98 for receiving a portion of the first valve member 76. Specifically, the first valve member 76 may include a first member shaft 100 extending into the channel 98. As the first valve member 76 moves between the first, second, and third positions, the first member shaft 100 is moveable in the channel 98. It is to be appreciated that the channel 98 may be defined by the valve shaft 94, as described above, and/or that the second valve member 78 may define the channel 98.

The second valve member 78 may include a base 102 coupled to and disposed about the valve shaft 94, and may include a projection 104 extending from the base 102 and about the valve shaft 94 into the valve interior 88. As shown in FIGS. 7, 8, and 10-12, the biasing member 90 may be disposed about the projection 104 of the second valve member 78. When present, the projection 104 extends from the base 102 into the valve interior 88 of the first valve member 76. In the illustrated embodiment, the projection 104 has a cylindrical configuration. However, it is to be appreciated that the projection 104 may have any suitable configuration. Although not required, typically the projection 104 is integral with the base 102. However, it is to be appreciated that the projection 104 may not be integral with the base 102 and instead the projection 104 may be coupled to the base 102 in any suitable manner. Although not required, the base 102 typically has a circular configuration, particularly when the valve seat 62 has a circular configuration. However, it is to be appreciated that the base 102 may have any configuration suitable for engaging the valve seat 62.

As described above, the second valve member 78 is moveable between the first and second positions. When the second valve member 78 is in the first position, as shown in FIGS. 10 and 11, the base 102 is engaged with the valve seat 62 of the exterior surface 66 of the turbine housing 36 for restricting exhaust gas from the first and second volutes 54, 56 from bypassing the turbine housing interior 40. When the second valve member 78 is in the first position, exhaust gas flows through the first and/or second volutes 54, 56 to the turbine housing interior 40 and is restricted from bypassing the turbine housing interior 40 because the base 102 of the second valve member 78 is engaged with the valve seat 62.

When the second valve member 78 is in the first position, the valve shaft 94 movable along the axis A relative to the second valve member 78 in order to move the first valve member 76 between the first and second positions. Moreover, the second end 86 of the first valve member 76 may abut the base 102 of the second valve member 78, as shown in FIG. 11, when the first valve member 76 is in the second position and the second valve member 78 is in the first position.

With reference to FIG. 10, when the second valve member 78 is in the first position and the first valve member 76 is in the first position, pulses of exhaust gas from the first and second groups of cylinders 70, 72 flow through the first and second volutes 54, 56, respectively, to the turbine housing interior 40 and are restricted from flowing between the first and second volutes 54, 56 and from bypassing the turbine housing interior 40. Exhaust gas is restricted from flowing between the first and second volutes 54, 56, because the first valve member 76 is adjacent and/or engaged with the wall 60, and exhaust gas is restricted from bypassing the turbine housing interior 40 because the base 102 of the second valve member 78 is engaged with the valve seat 62.

With reference to FIG. 11, when the second valve member 78 is in the first position and first valve member 76 is in the second position, exhaust gas can flow between the first and second volutes 54, 56 because the first valve member 76 is spaced from the wall 60. However, exhaust gas is restricted from bypassing the turbine housing interior 40 because the base 102 of the second valve member 78 is engaged with the valve seat 62.

With reference to FIG. 12, when the second valve member 78 is in the second position, also referred to as the open position, the base 102 is disengaged with the valve seat 62 of the exterior surface 66 of the turbine housing 36 for allowing exhaust gas from the first and second volutes 54, 56 to bypass the turbine housing interior 40. Because the base 102 of the second valve member 78 is disengaged from the valve seat 62, pulses of exhaust gas from the first and second groups of cylinders 70, 72 flow through the first and second volutes 54, 56, respectively, and through the valve cavity 64 to the environment outside of the turbine housing 36, thereby bypassing the turbine housing interior 40.

Typically, the first valve member 76 is in the third position when the second valve member 78 is in the second position, as shown in FIG. 12. However, it is to be appreciated that the first valve member 76 may be in the first and/or second position when the second valve member 78 is in the second position. In such embodiments, portions of the pulses of exhaust gas from the first and second groups of cylinders 70, 72 bypass the turbine housing interior 40 whereas other portions of the pulses of exhaust gas flow through the first and/or second volutes 54, 56 to the turbine housing interior 40.

Figure 7:
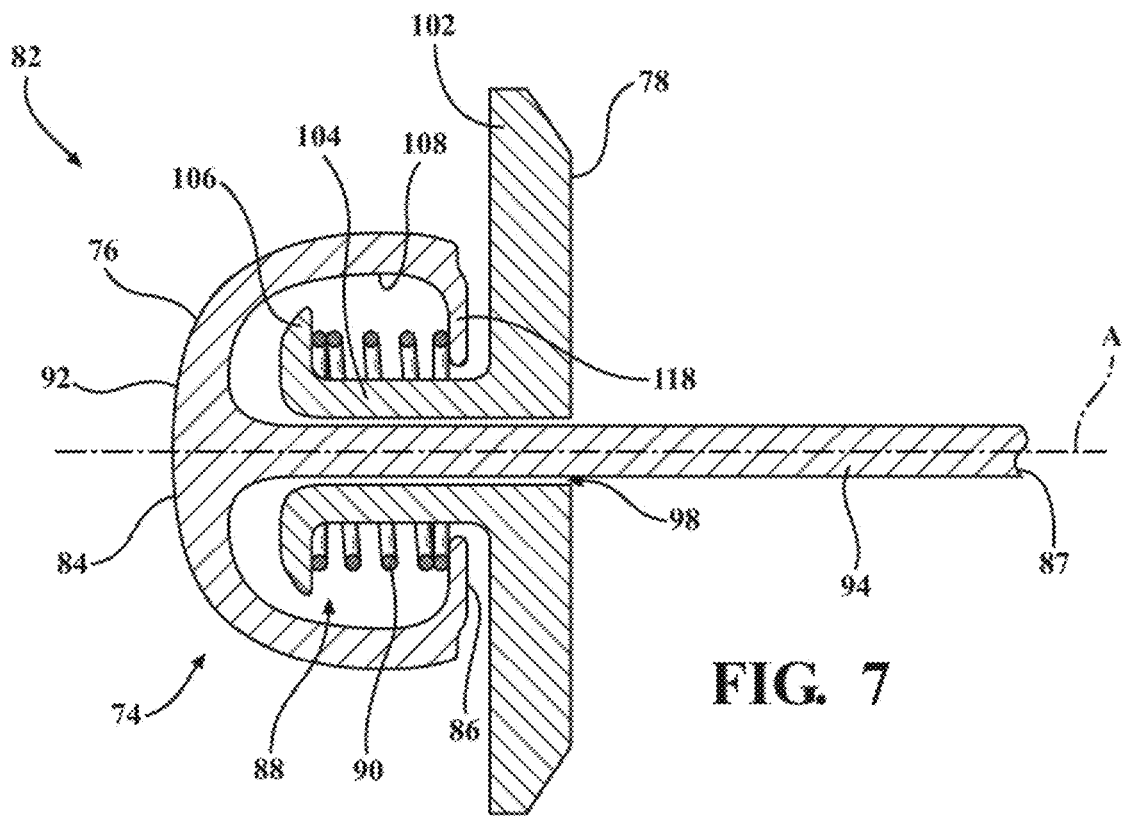
FIG. 7 is a cross-sectional view of the valve assembly of FIG. 5, showing the first valve member extending along the axis between a first end and a second end spaced from the first end, with the first valve member defining a valve interior between the first and second ends, and with a biasing member disposed in the valve interior.

With reference to FIG. 7, the biasing member 90 biases the first valve member 76 into the second position when the second valve member 78 is in the first position. As such, a force must be applied to the valve shaft 94 strong enough to overcome a corresponding force of the biasing member 90 in order to move the valve shaft 94 so that the first valve member 76 is moved from the second position to the first position. Similarly, when the biasing member 90 biases the first valve member 76 into the first position when the second valve member 78 is in the first position, a force must be applied to the valve shaft 94 strong enough to overcome a corresponding force of the biasing member 90 in order to move the valve shaft 94 so that the first valve member 76 is moved from the first position to the second position. The biasing member 90 may reduce noise, vibration, and harshness (NVH) characteristics associated with the valve assembly 82 during operation of the dual volute turbocharger 20.

Exposure of the biasing member 90 to exhaust gas increases wear of the biasing member 90, thereby reducing efficiency of the dual volute turbocharger 32. Specifically, exposure of the biasing member 90 to exhaust gas leads to relaxation and reduction in force capability, material degradation, oxidation, and/or corrosion of the biasing member 90 (i.e., wear of the biasing member). Moreover, exposure of the biasing member 90 to exhaust gas can ultimately lead to failure of the biasing member 90 due to the wear. Because the biasing member 90 is disposed in the valve interior 88, the biasing member 90 is shielded/protected from exhaust gas during operation of the dual volute turbocharger 32. In other words, exposure of the biasing member 90 to exhaust gas during operation of the dual volute turbocharger 32 is reduced as compared to other components of the valve assembly 82, such as the first and second valve members 76, 78. As such, wear of the biasing member 90 is also reduced, thereby increasing the efficiency of the dual volute turbocharger 32 and increasing lifetime of the dual volute turbocharger 32.

With reference again to FIG. 7, in some embodiments, the biasing member 90 is disposed about the projection 104 of the second valve member 78. In such embodiments, the biasing member 90 is disposed about both the valve shaft 94 and the projection 104. However, it is to be appreciated that the biasing member 90 may be disposed about valve shaft 94 and not about the projection 104, as shown in FIG. 8.

With continued reference to FIG. 7, the second valve member 78 may include a lip 106 extending radially from the projection 104 with respect to the axis A. The biasing member 90 may be disposed between and in contact with the lip 106 of the second valve member 78 and the second end 86 of the first valve member 76. Typically, the lip 106 is disposed in the valve interior 88 and is spaced from the base 102 of the second valve member 78, as shown in the illustrated embodiment. The configuration of the lip 106 is not particularly limited. For example, the lip 106 may have a circular configuration, a rectangular configuration, and the like. In the illustrated embodiment, the lip 106 is integral with the projection 104. However, it is to be appreciated that the lip 106 may not be integral with the projection 104 and instead may be coupled to the projection 104 in any suitable manner.

When the second valve member 78 includes the projection 104, the biasing member 90 is typically disposed between and in contact with the lip 106 of the second valve member 78 and the second end 86 of the first valve member 76, as shown in FIG. 7. In such embodiments, the second biasing member 90 is disposed about both the valve shaft 94 and the projection 104. Moreover, in such embodiments, the biasing member 90 typically biases the first valve member 76 into the second position when the second valve member 78 is in the first position.

Figure 8:
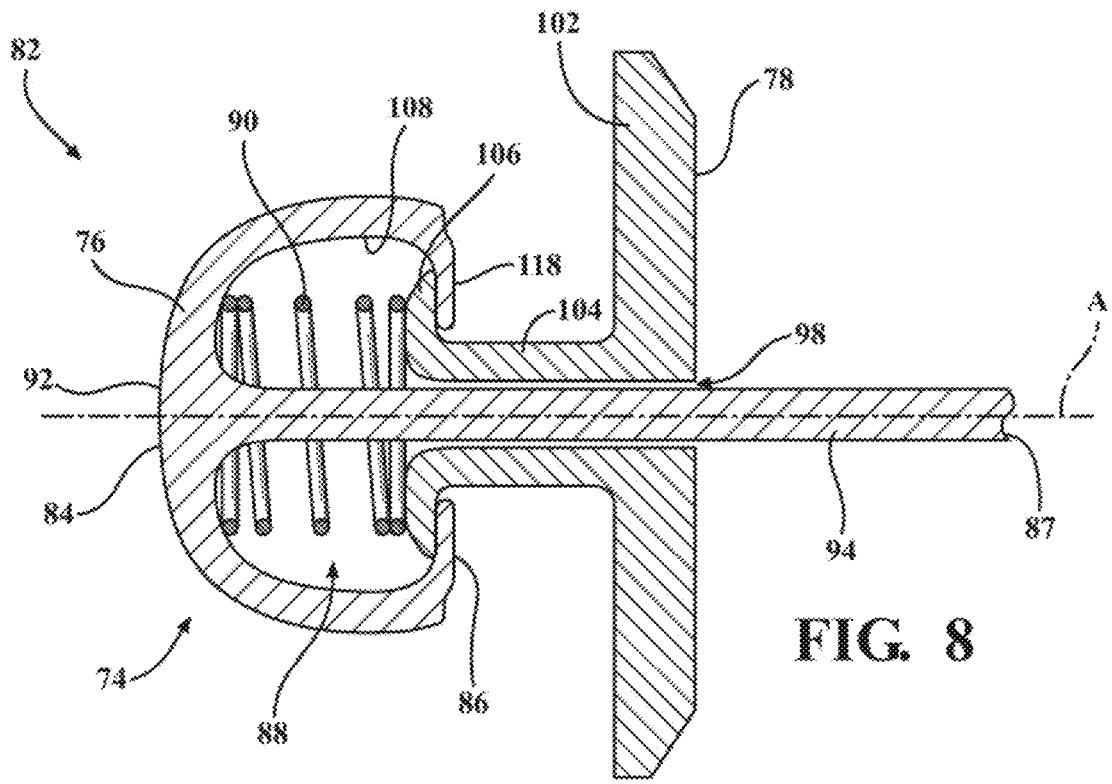
FIG. 8 is cross-sectional view of the valve assembly according to another embodiment.

In other embodiments, the biasing member 90 is disposed between and in contact with the lip 106 of the second valve member 78 and the first end 84 of the first valve member 76, as shown in FIG. 8. In such embodiments, the biasing member 90 is disposed about the valve shaft 94 but not the projection 104 of the second valve member 78. Furthermore, in such embodiments, the biasing member 90 typically biases the first valve member 76 into the first position when the second valve member 78 is in the first position. Moreover, in such embodiments, the second end 86 of the first valve member 76 may abut the lip 106 of the second valve member 78 when the first valve member 76 is in the first position.

With reference again to FIG. 7, in some embodiments, the first valve member 76 has an inner contour 108 facing the valve interior 88 and the outer contour 92 facing away from the valve interior 88. In some embodiments, the outer contour 92 is configured to reduce wear of the valve assembly 82. Specifically, the outer contour 92 may reduce wear by reducing contact stress between the valve assembly 82 and the turbine housing 36.

During operation of the dual volute turbocharger 32, exhaust gas flows through the first and second volutes 54, 56 and exerts a force on the first valve member 76. Over time, force exerted by exhaust gas on the first valve member 76 causes wear of the first valve member 76, the valve shaft 94, and the second valve member 78. Specifically, force exerted by exhaust gas on the first valve member 76 causes the first valve member 76, the valve shaft 94, and the second valve member 78 to vibrate against each other and also causes the first and second valve members 76, 78 to vibrate against the turbine housing 36. These repeated vibrations cause wear of the first and second valve members 76, 78 and the valve shaft 94, thereby decreasing efficiency of the dual volute turbocharger 32 and ultimately leading to failure of the valve assembly 82. Wear of the first and second valve members 76, 78, and the valve shaft 94 also decreases efficiency of the dual volute turbocharger 32 because the wear results in a loss of control over the amount of exhaust bypassing the turbine housing interior 40 and also a loss of control over turbocharger boost levels. When the outer contour 92 is configured to reduce wear of the valve assembly 82, the outer contour 92 reduces force exerted by exhaust gas on the first valve member 76, thereby reducing wear of the first and second valve members 76, 78 and the valve shaft 94 because vibrations of the first and second valve members 76, 78 and the valve shaft 94 against each other and/or the turbine housing 36 are reduced. This reduced wear results in increased efficiency of the dual volute turbocharger 32, and increased lifetime of the dual volute turbocharger 32.

Figure 13:
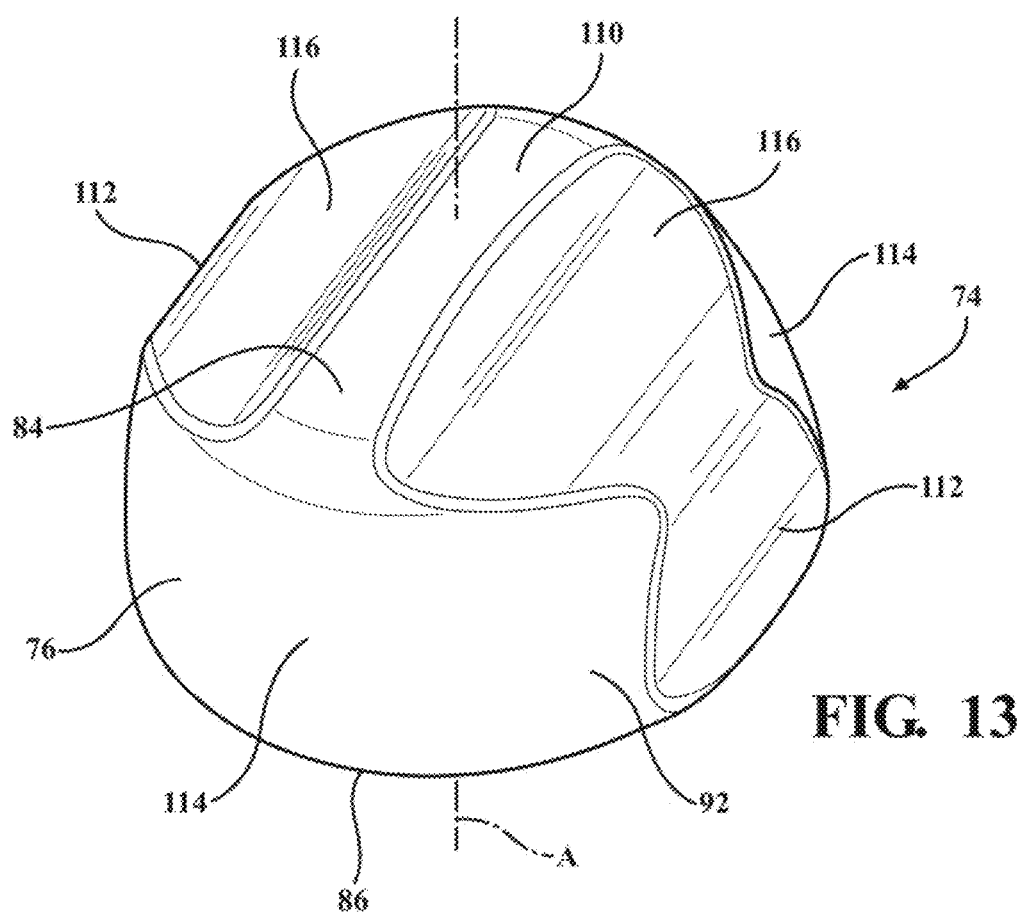
FIG. 13 is an isometric view of the first valve member of the valve assembly according to another embodiment, with the outer contour of the first valve member including a protrusion configured to engage the wall of the turbine housing.
Figure 14:
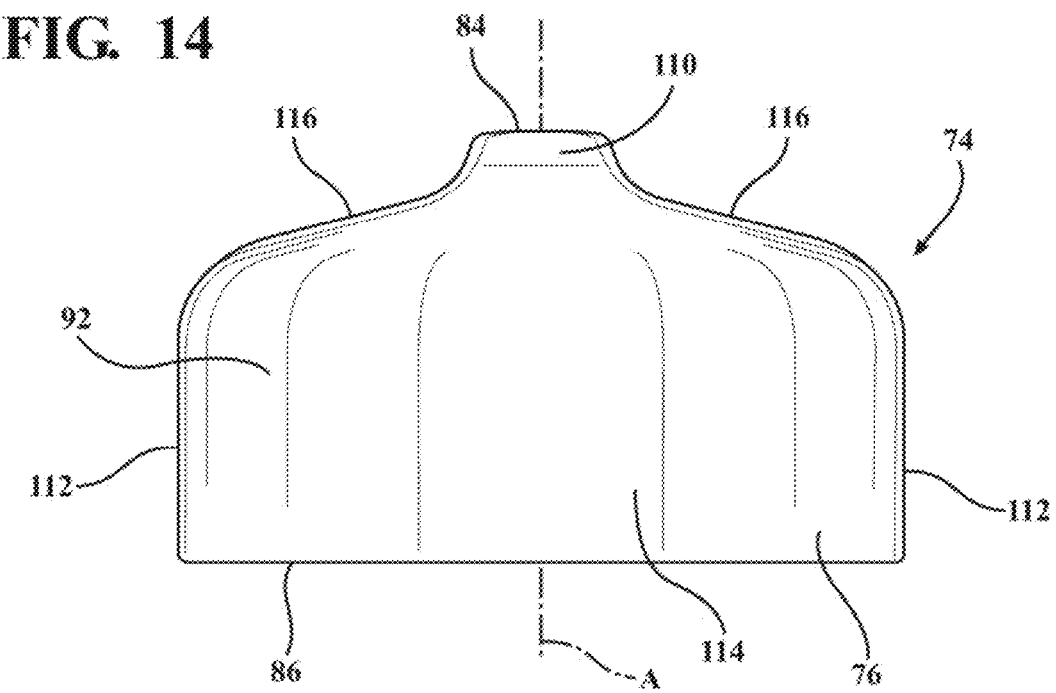
FIG. 14 is a side view of the first valve member of FIG. 13.

With reference to FIGS. 13 and 14, when the outer contour 92 is cup-shaped, the outer contour 92 may include a protrusion 110. The protrusion 110 extends axially away from the valve shaft 94 and is configured to be engageable the wall 60 of the turbine housing 36 when the first valve member 76 is in the first position. When present, the protrusion 110 is located at the first end 84 of the first valve member 76. Typically, the protrusion 110 has a configuration that is complementary with the wall 60 of the turbine housing 36 for engaging the wall 60 such that the protrusion 110 prevents exhaust gas from flowing between the first and second volutes 54, 56 when the first valve member 76 is in the first position. In this manner, the outer contour 92 can be configured to reduce wear and/or improve flow characteristics of the valve assembly 82 while also ensuring that exhaust gas does not flow between the first and second volutes 54, 56 when the first valve member 76 is in the first position.

Figure 6:
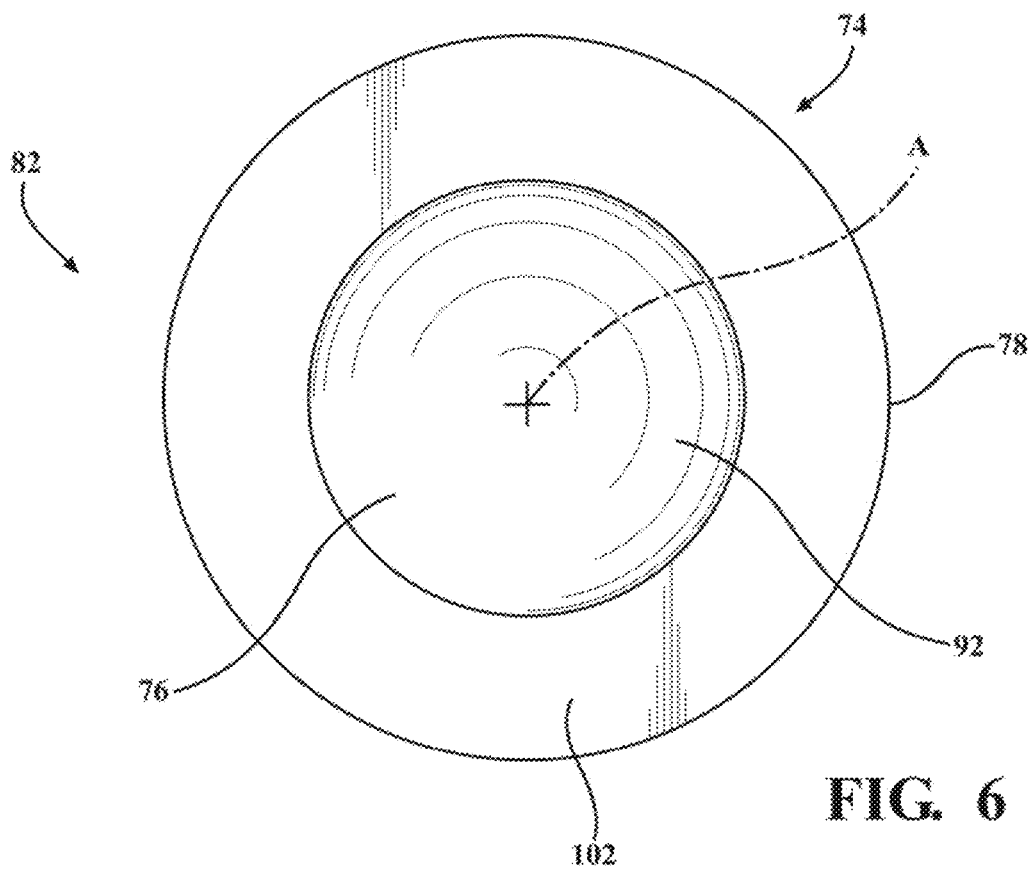
FIG. 6 is a front view of the valve assembly of FIG. 5, showing an outer contour of the first valve member that is rotationally symmetric about an axis.

In some embodiments, the outer contour 92 of the first valve member 76 is rotationally symmetric about the axis A, as shown in FIG. 6. When the outer contour 92 is rotationally symmetric about the axis A, typically the outer contour 92 is cup-shaped. However, it is to be appreciated that the outer contour 92 may be cup-shaped and not rotationally symmetric about the axis A, as shown in FIGS. 13 and 14. Moreover, it is to be appreciated that the outer contour 92 may be rotationally symmetric about the axis A and not cup-shaped.

With reference again to FIG. 13, the outer contour 92 may further include sidewalls 112. When present, the sidewalls 112 extend from the second end 86 of the first valve member 76 and along the axis A in the direction of the second end 86. Typically, the sidewalls are parallel, or substantially parallel, with the axis A. With reference to FIGS. 13 and 14, the outer contour 92 includes two sidewalls 112. However, it is to be appreciated that the outer contour 92 may include any suitable number of sidewalls. For example, the outer contour 92 may include three, four, or even more sidewalls 112. The sidewalls 112 alter exhaust gas flow around the first valve member 76, particularly when the first valve member 76 is in the first and second positions, and may further reduce wear and/or improve flow characteristics of the valve assembly 82 in addition to allowing a greater volume of exhaust gas to bypass the turbine housing interior 40 when the first valve member 76 is in the third position. When present, the sidewalls 112 are spaced circumferentially from each other with respect to the axis A. Typically, the sidewalls 112 are spaced equally and circumferentially from each other with respect to the axis A, as shown in FIG. 14. Alternatively, the sidewalls 112 may not be spaced equally and circumferentially from each other. Instead, the sidewalls 112 may be spaced circumferentially from each other at an angle of from about 140° to 180° with respect to the axis A. With reference to FIG. 13, the sidewalls 112 are circumferentially spaced from each other at an angle of 180° with respect to the axis A.

With continued reference to FIG. 13, when the sidewalls 112 are present, the outer contour 92 typically includes first surface portions 114. Each of the first surface portions 114 extends about the axis A from one of the sidewalls 112 to an adjacent sidewall 60, as shown in FIG. 12. Typically, the first surface portions 114 have an arcuate configuration. Although not required, typically the number of first surface portions 114 included in the outer contour 92 is equal to the number sidewalls 112. When the protrusion 110 and the first and second surface portions 114, 116 are present, the protrusion 110 may extend between the first and second surface portions 114, 116, as shown in FIG. 13. The first surface portions 114 are spaced circumferentially from each other with respect to the axis A. Typically, the first surface portions 114 are spaced equally and circumferentially from each other with respect to the axis A.

The outer contour 92 may further include second surface portions 116, as shown in FIGS. 13 and 14. When present, the second surface portions 116 further reduce wear and/or improve flow characteristics of the valve assembly 82 by altering exhaust gas flow around the first valve member 76, particularly when the first valve member 76 is in the first, second, and third positions. The second surface portions 116 may have an arcuate configuration. When the projection 104 and the sidewalls 112 are included in the outer contour 92 of the first valve member 76, each second surface portion 116 extends between one of the sidewalls 112 to the projection 104. In this manner, the outer contour 92 is further optimized for reducing wear of the valve assembly 82.

With reference again to FIG. 7, the second end 86 of the first valve member 76 may include a cover 118 extending about the axis A. When the second end 86 includes the cover 118, the cover 118 is disposed about the valve shaft 94. Moreover, when the cover 118 is present, the cover 118 and the inner contour 108 collectively define the valve interior 88. During operation of the dual volute turbocharger 32, the cover 118 further reduces exposure of the biasing member 90 to exhaust gas. The cover 118 may be integral with the valve member 74, as shown in FIG. 7. However, it is to be appreciated that the cover 118 may not be integral with the first valve member 76 and instead may be coupled to the first valve member 76 in any suitable manner. In some embodiments, the cover 118 is configured to reduce wear of the valve assembly 82. In embodiments where the cover 118 is configured to reduce wear of the valve assembly 82, the cover 118 reduces force exerted by exhaust gas on the first valve member 76, thereby reducing wear of the first and second valve members 76, 78 and the valve shaft 94 because vibrations of the first and second valve members 76, 78 and the valve shaft 94 against each other and/or the turbine housing 36 are reduced. This reduced wear results in increased efficiency of the dual volute turbocharger 32, and increased lifetime of the dual volute turbocharger 32. The second end 86 may act as a stop surface such that the second valve member 78 engages the second end 86, which reduces wear of the first and second valve members 76, 78 when the first valve member 76 is in the second and third position.

With continued reference to FIG. 7, the biasing member 90 is disposed between and in contact with the lip 106 of the second valve member 78 and the cover 118 of the first valve member 76. However, it is to be appreciated that the biasing member 90 is not necessarily in contact with the cover 118 when the cover 118 is present, as shown in FIG. 8.

Figure 15:
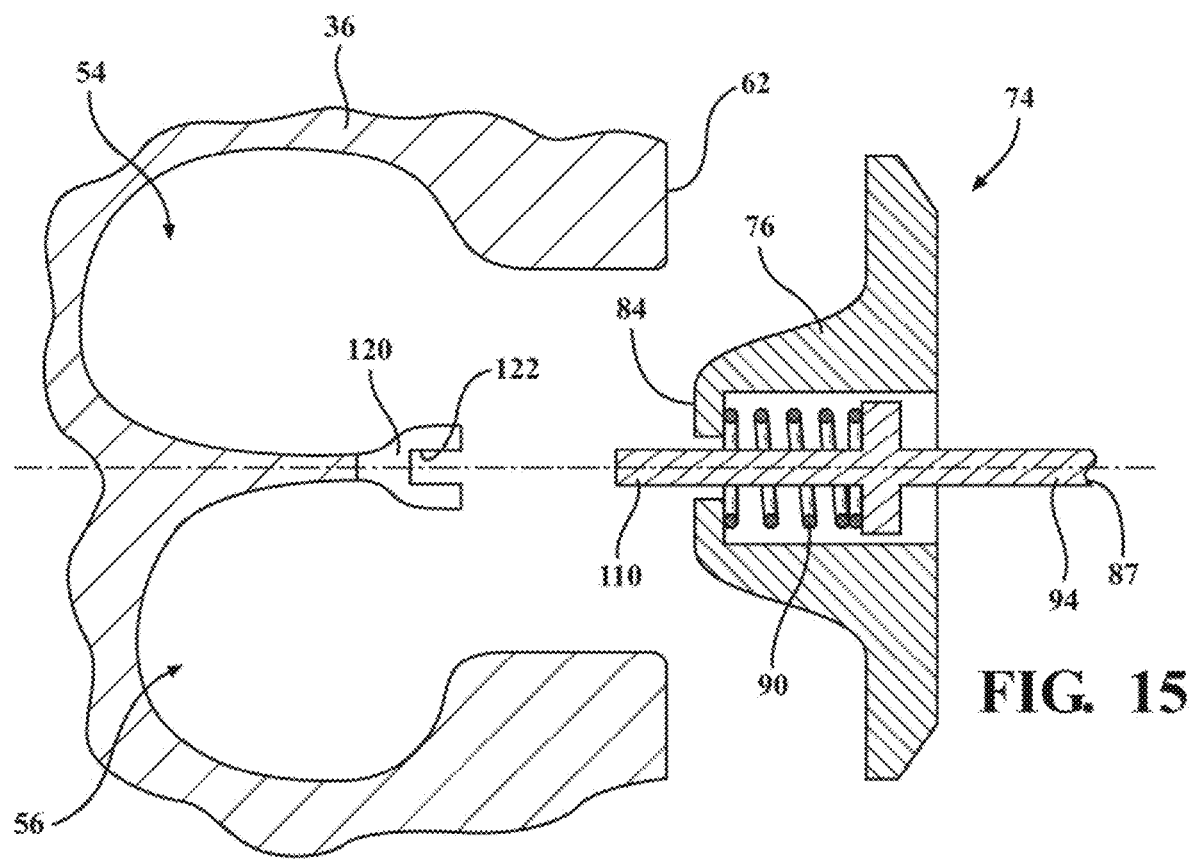
FIG. 15 is a side view of the valve assembly according to another embodiment.
Figure 16:
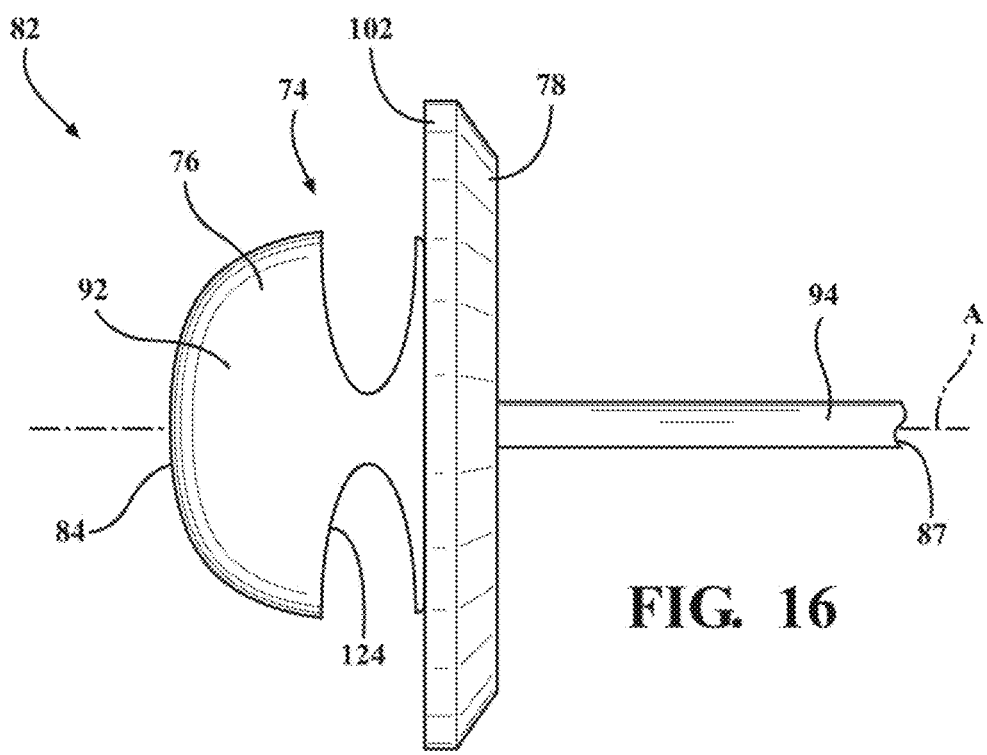
FIG. 16 is a side view of the valve assembly according to another embodiment.
Figure 17:
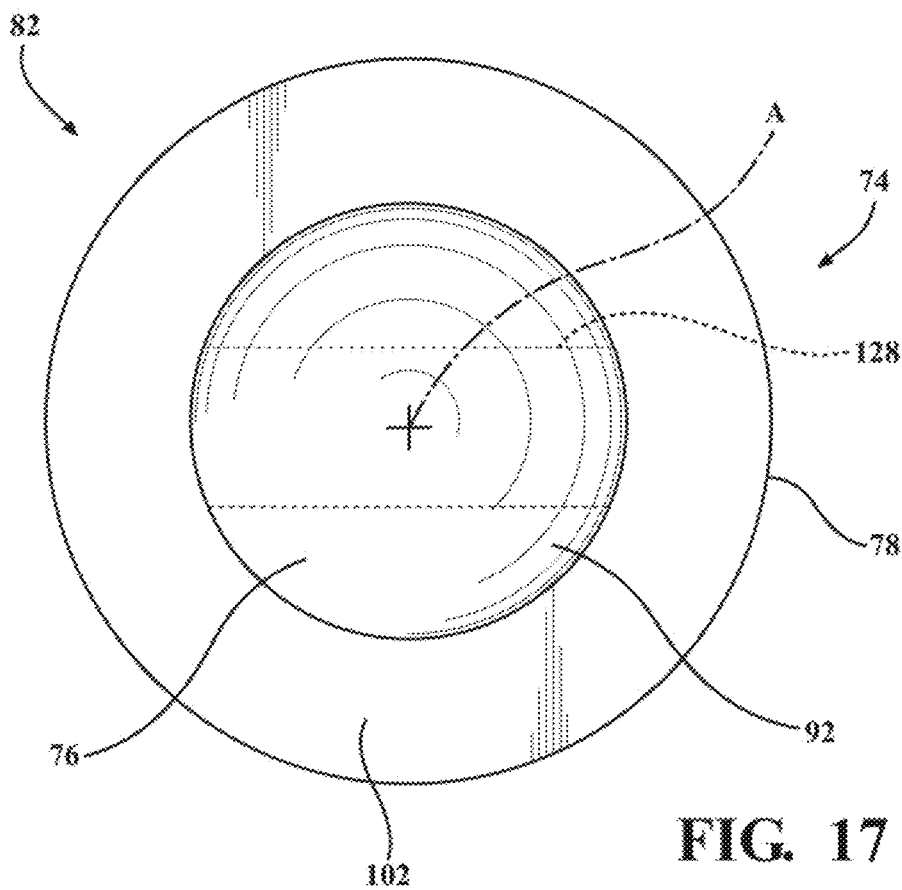
FIG. 17 is a top view of the valve assembly of FIG. 16.
Figure 23:
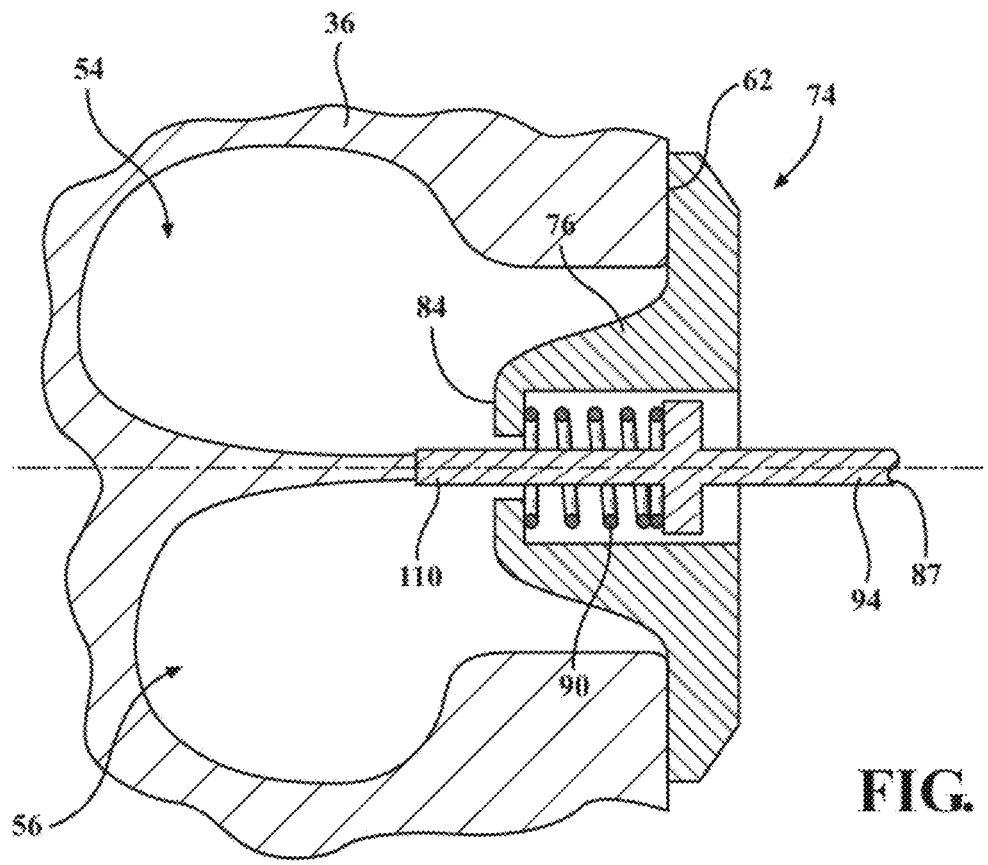
FIG. 23 is a cross-sectional view of the valve assembly according to another embodiment.
Figure 24:
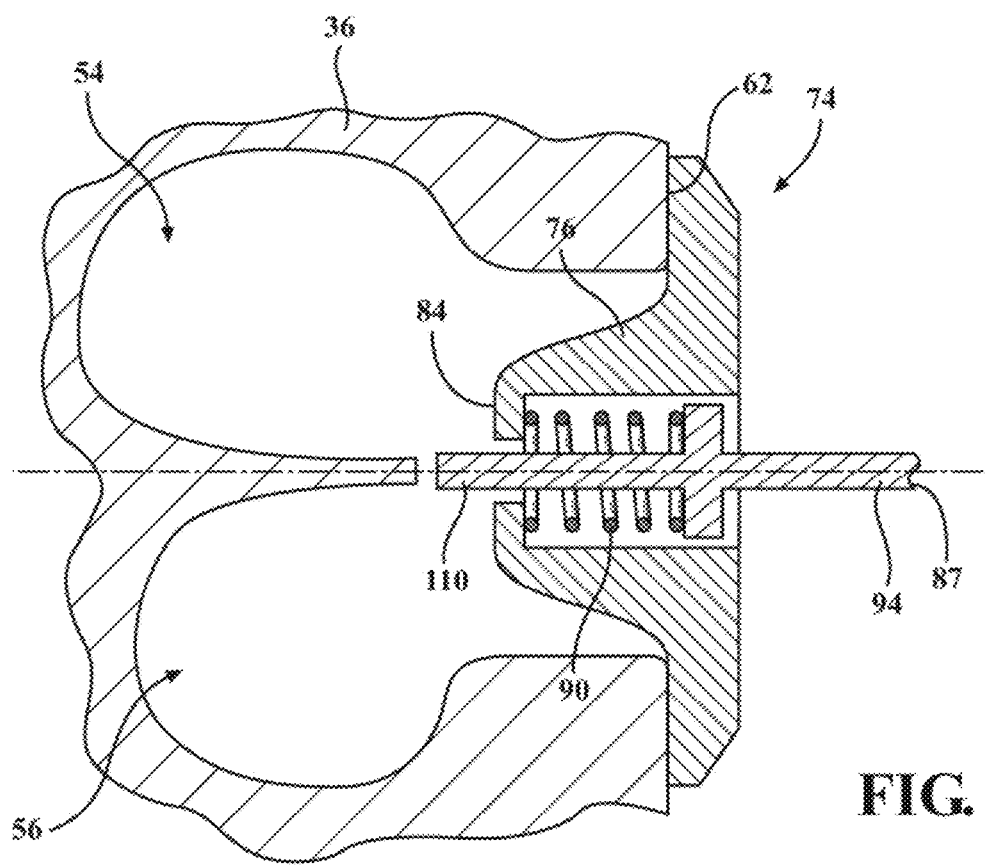
FIG. 24 is a cross-sectional view of the valve assembly of FIG. 23.
Figure 25:
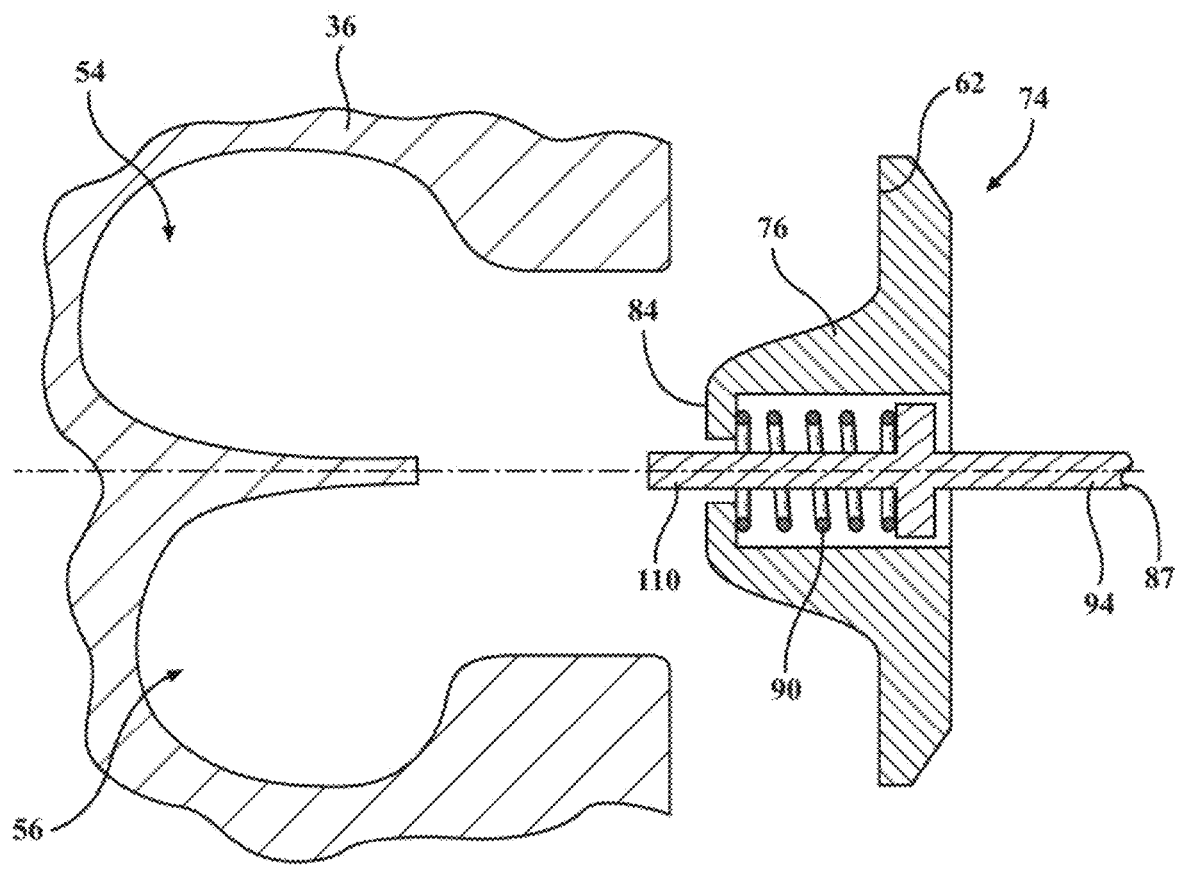
FIG. 25 is a cross-sectional view of the valve assembly of FIG. 23.

With reference to FIG. 15, the protrusion 110 of the first valve member 76 may be configured to fit in a wall extension 120 defining a wall cavity 122. When present, the wall extension 120 extends from the wall 60 to define the wall cavity 122. As shown in FIG. 15, the protrusion 110 may be a portion of the valve shaft 94 extending away from the outer contour 92 of the first valve member 76. However, it is to be appreciated that any suitable protrusion extending from the outer contour 92 of the first valve member 76 may be used for fitting in the wall cavity 122. It is also to be appreciated that the wall extension 120 may be integral with the turbine housing 36. As described above with respect to other embodiments, the first and second valve members 76, 78 shown in FIG. 15 may similarly be moved into the first, second, and third positions for the first valve member 76, and the first and second positions for the second valve member 78. It is also to be appreciated that in such embodiments, the dual volute turbocharger 32 may be free of a wall extension, as shown in FIGS. 23-25. In such embodiments, the first valve member 76 is movable between the first, second, and third position, and the second valve member 78 is movable between the first and second position, as shown in FIGS. 23-25.

Figure 18:
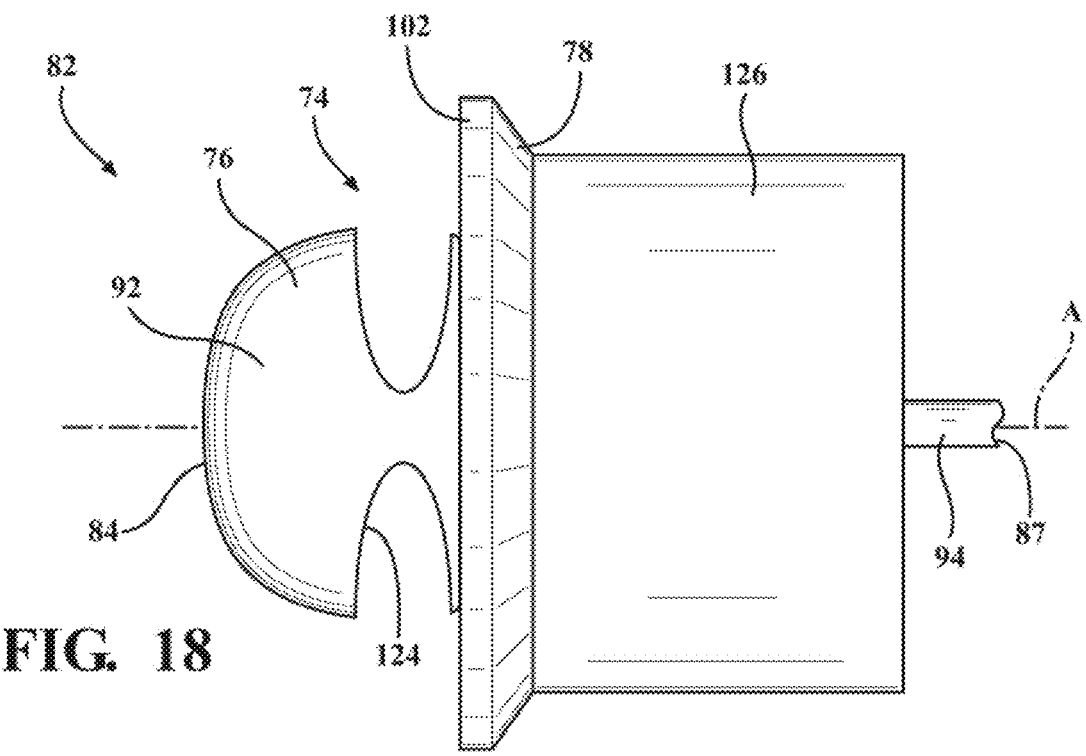
FIG. 18 is a side view of another embodiment of the valve assembly of FIG. 16.
Figure 19:
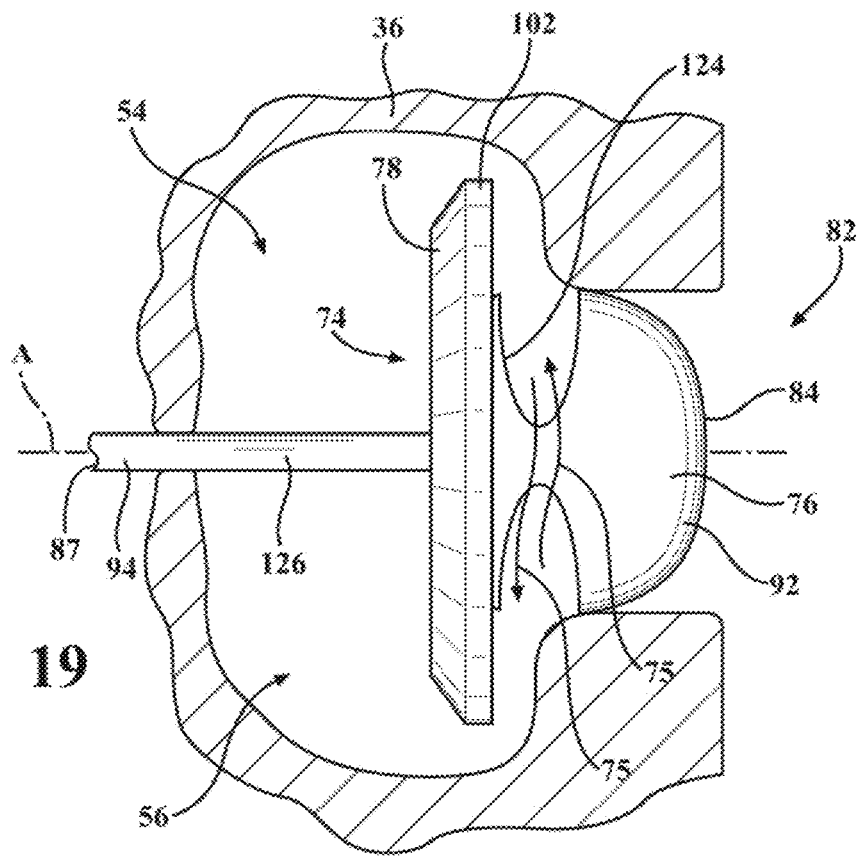
FIG. 19 is a side view of the valve assembly of FIG. 16, with the first valve member in the second position.

With reference to FIGS. 16-19, the first valve member 76 may define a cutout 124 disposed about the axis A for allowing exhaust gas to flow between the first and second volutes 54, 56 when the first valve member 76 is in the second and third positions. With reference to FIGS. 18 and 19, the valve shaft 94 of the valve assembly 82 may include a shaft wall 126. Specifically, the shaft wall 126 in FIG. 18 is shown rotated 90 degrees about the axis A with respect to the valve wall 60 shown in FIG. 19. The shaft wall 126 separates the first volute 54 from the second volute 56 such that exhaust gas is prevented from flowing between the first and second volutes 54, 56 when the first valve member 76 is in the first position. It is to be appreciated that the shaft wall 126 may be integral (i.e., one piece) with the valve shaft 94, or may be a separate component coupled to the valve shaft 94. The cutout 124 allows for exhaust gas to flow between the first and second volutes 54, 56 when the first valve member 76 is in the second and third positions, as shown by exhaust gas flow arrows 75. When the first valve member 76 is in the first position and the second valve member 78 and in particular, the base 102, is in the first position, exhaust gas is restricted from flowing between the first and second volutes 54, 56, and is restricted from bypassing the turbine housing interior 40.

Figure 20:
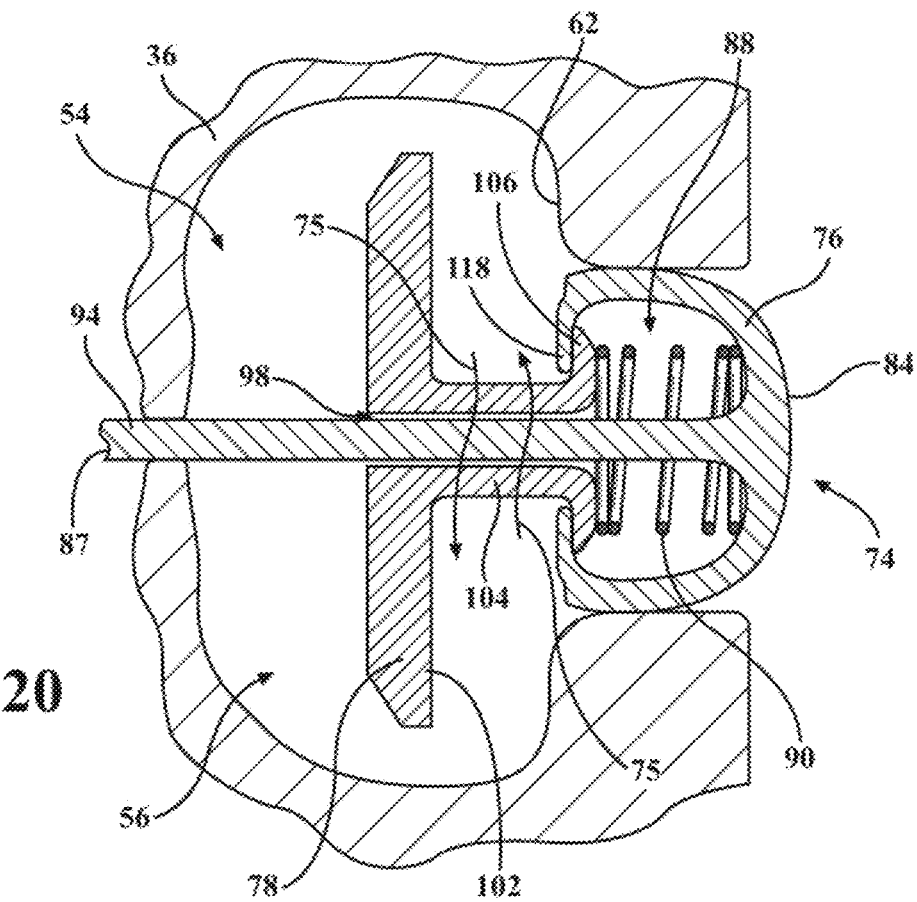
FIG. 20 is a cross-sectional view of the valve assembly according to another embodiment.

With reference to FIG. 20, another embodiment of the valve assembly 82 including the valve shaft 94 and the shaft wall 126 is shown. With reference to FIG. 21, another embodiment of the valve assembly 82 is shown. The first valve member 76 shown in FIGS. 20 and 21 is configured to be engageable with the turbine housing 36. As shown in FIG. 21, the turbine housing 36 may define a turbine housing cutout 128.

During operation of the internal combustion engine 34 and the dual volute turbocharger 32, the first valve member 76 is moved between the first, second, and third positions and the second valve member 78 between the first and second positions based on operating conditions of the internal combustion engine 34 and the dual volute turbocharger 32. When the first valve member 76 is in the first position and the second valve member 78 is in the first position, also referred to as the closed position (FIG. 10), as pulses of exhaust gas flow from the first and second groups of cylinders 70, 72 and through the first and second volutes 54, 56, respectively, the pulses of exhaust gas exert a back pressure on the internal combustion engine 34. When the back pressure on the internal combustion engine 34 meets or exceeds a particular threshold that is associated with deleteriously impacting the internal combustion engine 34, the first valve member 76 is moved to the second position while the second valve member 78 remains in the first position (FIG. 11). This reduces the back pressure on the internal combustion engine 34 to non-deleterious levels while also maintaining efficiency of the dual volute turbocharger 32 because the pulses of exhaust gas from each of the first and second groups of cylinders 70, 72 flow through both of the first and second volutes 54, 56, to the turbine housing interior 40, where the pulses of exhaust gas rotate the turbine wheel 42. It is to be appreciated that the first valve member 76 may be moved to the second position, or to a position between the first and second positions, in order to reduce back pressure on the internal combustion engine 34 while also maintaining efficiency of the dual volute turbocharger 32.

During operation of the internal combustion engine 34 and the dual volute turbocharger 32, the pulses of exhaust gas from each of the first and second groups of cylinders 70, 72 may exert a back pressure on the internal combustion engine 34 large enough that the back pressure cannot be reduced to non-deleterious levels by moving the first valve member 76 between the first and second positions while the second valve member 78 is in the closed position. In such instances, the second valve member 78 is moved from the first position to the second position (FIG. 12). As described above, typically the first valve member 76 is in the third position when the second valve member 78 is in the second position. Moving the second valve member 78 into the second position allows exhaust gas from the first and second groups of cylinders 70, 72 to bypass the turbine housing interior 40 to an environment outside of the turbine housing 36, thereby ensuring the back pressure on the internal combustion engine 34 is reduced to non-deleterious levels. It is to be appreciated that the second valve member 78 may be moved to the open position, or to a position between the closed and open positions, in order ensure that the back pressure on the internal combustion engine 34 is reduced to non-deleterious levels.

Figure 22:
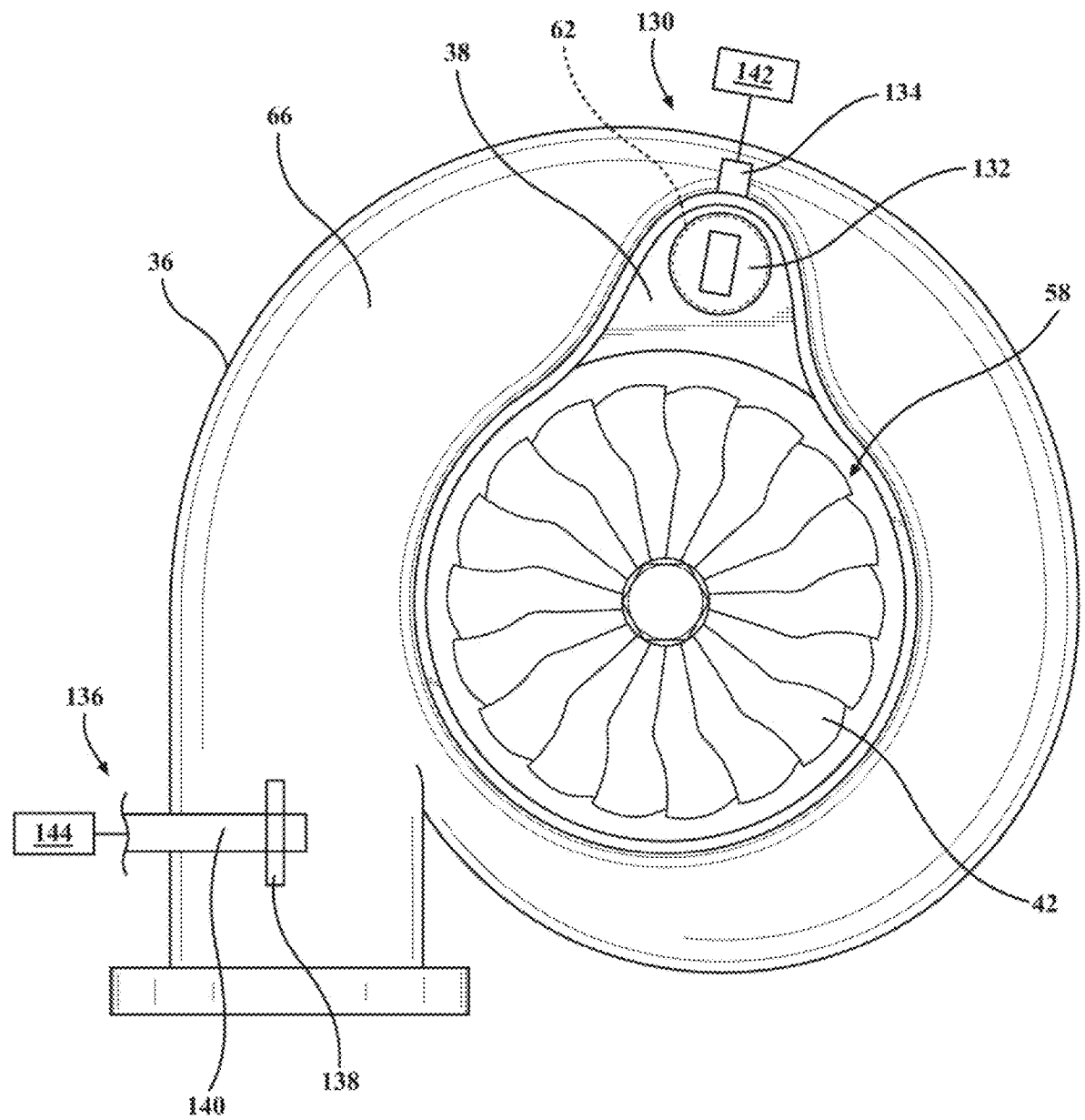
FIG. 22 is a top view of the turbine housing according to another embodiment, with the dual volute turbocharger including a first valve assembly for controlling exhaust gas flow between the first and second volutes, and a second valve assembly for controlling exhaust gas from the first and second volutes to the turbine housing interior.

With reference to FIG. 22, the dual volute turbocharger 32 further includes a first valve assembly 130 for controlling exhaust gas flow between the first and second volutes 54, 56. When present, the first valve assembly 130 includes a first valve member 132 engageable with the wall 60 of the turbine housing 36 and disposed about and extending along the axis A between the first end 84 adapted to be proximal to the wall 60 of the turbine housing 36 and a second end 86 spaced from the first end 84 and adapted to be distal to the wall 60 of the turbine housing 36. It is to be appreciated that the first valve member 132 of the first valve assembly 130 may have a similar or the same configuration as the first and/or second valve members 76, 78 shown throughout FIGS. 6-21. The first valve member 132 is movable between a first position and a second position. When in the first position, the first valve member 132 of the first valve assembly 130 is adjacent the wall 60 of the turbine housing 36 for restricting exhaust gas from flowing between the first and second volutes 54, 56. When in the second position, the first valve member 132 of the first valve assembly 130 is spaced from the wall 60 of the turbine housing 36 for allowing exhaust gas to flow between the first and second volutes 54, 56. When present, the first valve assembly 130 typically includes a first valve shaft 134 of the first valve assembly 130 coupled to the first valve member 132 of the first valve assembly 130 for moving the first valve member 132 between the first and second positions.

With continued reference to FIG. 22, the dual volute turbocharger 32 may include a second valve assembly 136 for controlling exhaust gas from the first and second volutes 54, 56 to the turbine housing interior 40. When present, a second valve member 138 of the second valve assembly 136 is engageable with a second valve seat of the turbine housing 36. The second valve member 138 of the second valve assembly 136 is movable between a first position and a second position. When in the first position, the second valve member 138 of the second valve assembly is engaged with the second valve seat of the turbine housing 36 for restricting exhaust gas from the first and second volutes 54, 56 from bypassing the turbine housing interior 40. When in the second position, the second valve member 138 of the second valve assembly is disengaged with the second valve seat of the turbine housing 36 for allowing exhaust gas from the first and second volutes 54, 56 to bypass the turbine housing interior 40. When present, the second valve assembly 136 typically includes a second valve shaft 140 coupled to the second valve member 138 for moving the second valve member 78 between the first and second positions. It is to be appreciated that the second valve member 138 of the second valve assembly 136 may have a similar or the same configuration as the first and/or second valve members 76, 78 shown throughout FIGS. 6-21.

At least one of the first and second valve members 132, 138 may have an outer contour configured to reduce wear of the corresponding first and/or second valve assembly 130, 136. In one embodiment, the outer contour is cup-shaped to reduce wear of the corresponding first and/or second valve assembly 130, 136.

The first valve assembly 130 may include a first actuator 142 operably coupled to the first valve shaft 134 for moving the first valve shaft 134 to move the first valve member 132 between the first and second positions. Similarly, the second valve assembly 136 may include a second actuator 144 operably coupled to the second valve shaft 140 for moving the second valve shaft 140 to move the second valve member 138 between the first and second positions.

With reference again to FIG. 1, the system 30 includes a controller 146. The controller 146 is adapted to control the at least one valve member 74 to have an area constant ratio ($C_{AR}$) operating range according to a brake-specific fuel consumption (BSFC) of the internal combustion engine 34, with the $C_{AR}$ defined by the equation: Area Ratio Constant ($C_{AR}$)=the first cross-sectional flow area/($\rho_{power}$*the second cross-sectional flow area), where $\rho_{power}$ is the power density in kW/L of the internal combustion engine 34. It is to be appreciated that the power density of the internal combustion engine 34 may commonly be referred to as the rated power density of the internal combustion engine 34.

Controlling the at least one valve member 74 to have the $C_{AR}$ operating range according to the BSFC of the internal combustion engine 34 may optimize the BSFC of the internal combustion engine 34 by balancing the efficiency of the dual volute turbocharger 32 and the internal combustion engine 34 while also reducing the backpressure on the internal combustion engine 34. This optimization of the BSFC lowers fuel consumption of the internal combustion engine 34 during operation of the internal combustion engine 34 and the dual volute turbocharger 32. The configuration of the at least one valve member 74 allows the $C_{AR}$ to have a progression as the at least one valve member 74 moves between the first and second positions. In some embodiments, the controller 146 is adapted to control the at least one valve member 74 to have a $C_{AR}$ operating range from greater than or equal to 0.0000 L/kW to less than or equal to 0.150 L/kW. In other embodiments, the controller 146 is adapted to control the at least one valve member 74 to have a $C_{AR}$ operating range of from 0.0001 L/kW to 0.150 L/kW. In still other embodiments, the controller 146 is adapted to control the at least one valve member 74 to have a $C_{AR}$ operating range from greater than or equal to 0.0000 L/kW to less than or equal to 0.100 L/kW. In yet other embodiments, the controller 146 is adapted to control the at least one valve member 74 to have a $C_{AR}$ operating range of from 0.0001 to 0.100, or of from 0.0001 to 0.080 L/kW. In some embodiments, the controller 146 is adapted to control the at least one valve member 74 to have a $C_{AR}$ operating range of greater than or equal to 0.0001 to less than or equal to 0.100, or from greater than or equal to 0.0001 to less than or equal to 0.080 L/kW.

In embodiments where the at least one valve member 74 is further defined as the first and second valve members 76, 78, the controller 146 may be adapted to control the first and second valve members 76, 78 to have a $C_{AR}$ operating range from greater than or equal to 0.0000 L/kW to less than or equal to 0.150 L/kW. In other embodiments, the controller 146 is adapted to control the first and second valve members 76, 78 to have a $C_{AR}$ operating range of from 0.0001 L/kW to 0.150 L/kW. In still other embodiments, the controller 146 is adapted to control the first and second valve members 76, 78 to have a $C_{AR}$ operating range from greater than or equal to 0.0000 L/kW to less than or equal to 0.100 L/kW. In yet other embodiments, the controller 146 is adapted to control the first and second valve members 76, 78 to have a $C_{AR}$ operating range of from 0.0001 to 0.100, or of from 0.0001 to 0.080 L/kW. In some embodiments, the controller 146 is adapted to control the first and second valve members 76, 78 to have a $C_{AR}$ operating range from greater than or equal to 0.0001 to less than or equal to 0.100, or from greater than or equal to 0.0001 to less than or equal to 0.080 L/kW.

It is to be appreciated that when the first cross-sectional flow area FA1 and/or the second cross-sectional flow area FA2 are less than 0.1 mm^2 that the $C_{AR}$ is effectively zero. In other words, when the at least one valve member 74 is in the first position, or embodiments including the first and second valve members 76, 78 when the first valve member 76 is in the first position and the second valve member 76 is in the closed position, the first and second cross-sectional flow areas FA1, FA2 may be between 0.0 and 0.1 mm^2, which results in the $C_{AR}$ being zero or close to zero. However, it is also to be appreciated that when the at least one valve member 74 moves such that FA1 and/or FA2 are greater than 0.1 mm^2 and, therefore, the $C_{AR}$ is greater than zero, that the $C_{AR}$ may be between the range of greater than or equal to 0.0001 L/kW and less than or equal to 0.150 L/kW. It is further to be appreciated that the equation $C_{AR}$=the first cross-sectional flow area/($\rho_{power}$*the second cross-sectional flow area) also applies to embodiments where the at least one valve member 74 is moveable such that the second cross-sectional flow area FA2 is as low as zero. In other words, during operation, the second cross-sectional flow area FA2 may fluctuate down to as low as zero and still have the $C_{AR}$ be defined by the equation $C_{AR}$=the first cross-sectional flow area/($\rho_{power}$*the second cross-sectional flow area) through the operating range between the first and second positions of the at least one valve member 74.

The $C_{AR}$ operating range relates to the position of the at least one valve member 74. For example, when the at least one valve member 74 is closed, the $C_{AR}$ is zero. The first cross-sectional flow area FA1 and the second cross-sectional flow area FA2 are adjusted (i.e., the at least one valve member 74 moves) to optimize the BSFC of the internal combustion engine 34. Similarly, when the first valve member 76 and the second valve member 78 are present, the first cross-sectional flow area FA1 and the second cross-sectional flow area FA2 are adjusted (i.e., the first valve member 76 and second valve member 78 are moves) to optimize the BSFC of the internal combustion engine 34. Based on the position of the at least one valve member 74, or the first and second valve members 76, 78 when present, the $C_{AR}$ operating range is typically between 0.0000 L/kW to 0.150 L/kW, and the controller 146 controls the movement of the at least one valve member 74, or the first and second valve members 76, 78 when present, to achieve the desired $C_{AR}$ operating range, which is typically used to optimize the BSFC of the internal combustion engine 34. Achieving the desired $C_{AR}$ operating range allows the controller 146 to control movement of the first and second valve members 76, 78 to optimize the BSFC of the internal combustion engine 34.

The controller 146 may include one or more processors, or microprocessors, for processing instructions stored in memory 150 to control the at least one valve member 74. Such instructions may be any of the functions, algorithms or techniques described herein performed by the controller 146. Additionally, or alternatively, the controller 146 may include one or more microcontrollers, field programmable gate arrays, systems on a chip, discrete circuitry, and/or other suitable hardware, software, or firmware that is capable of carrying out the functions described herein. In some embodiments, the controller 146 is an engine control unit (ECU) that controls the at least one valve member 74 in addition to controlling various other components of the dual volute turbocharger 32 and/or internal combustion engine 34. In embodiments where the controller 146 is the engine control unit, the controller 146 is separate from the dual volute turbocharger 32. In other words, the controller 146 is a separate component that is not included on or in the dual volute turbocharger 32.

In other embodiments, the controller 146 is discrete from the ECU. For example, the controller 146 may be included on or in the dual volute turbocharger 32. In other words, the controller 146 is a component included on or in the dual volute turbocharger 32. With reference to FIG. 1, the system 30 may include the dual volute turbocharger 32, the internal combustion engine 34, and the controller 146. Typically, the system 30 also includes at least one sensor 148.

The controller 146 may be in communication with the actuator 96 for moving the at least one valve member 74 between the corresponding positions. In particular, the controller 146 is able to control the at least one valve member 74 such that an optimal area constant ratio ($C_{AR}$) is achieved. In embodiments that include the first valve member 76 and the second valve member 78, the controller 146 similarly in communication with the first actuator 96 and the second actuator 96 to control the first valve member 76 and second valve member 78, respectively. In particular, the controller 146 is able to control the first valve member 76 and the second valve member 78 such that an optimal area constant ratio ($C_{AR}$) is achieved.

One method of controlling the at least one valve member 74 of the dual volute turbocharger 32 is described in U.S. Provisional Patent Application No. 62/806,396 titled "Method Of Controlling A Valve Of A Dual Volute Turbocharger" (having named inventors Michael Cola, Sascha Weiske, and Mehul Sonigra), which was filed on Feb. 15, 2019 and is hereby incorporated by reference in its entirety.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A system comprising:
   a dual volute turbocharger for receiving exhaust gas from an internal combustion engine and for delivering compressed air to the internal combustion engine, said dual volute turbocharger comprising, a turbine housing comprising,
an interior surface defining,
a turbine housing interior adapted to receive a turbine wheel,
a first volute adapted for fluid communication with the internal combustion engine and said turbine housing interior for delivering exhaust gas from the internal combustion engine to said turbine housing interior,
a second volute adapted for fluid communication with the internal combustion engine and said turbine housing interior for delivering exhaust gas from the internal combustion engine to said turbine housing interior, and
a turbine housing outlet in fluid communication with said turbine housing interior for discharging exhaust gas from said turbine housing interior,
a wall separating said first volute from said second volute, and
a valve seat, and
at least one valve member engageable with at least one of said wall and said valve seat of said turbine housing for controlling exhaust gas flow from said first and second volutes to said turbine housing interior, with said at least one valve member and said wall of said turbine housing collectively defining a first cross-sectional flow area and said at least one valve member and said valve seat of said turbine housing collectively defining a second cross-sectional flow area; and
a controller adapted to control the at least one valve member to have an area ratio constant ($C_{AR}$) operating range according to a brake-specific fuel consumption (BSFC) of the internal combustion engine, with the $C_{AR}$ defined by the equation:
$C_{AR}$=first cross-sectional flow area/($\rho_{power}$*second cross-sectional flow area), where $\rho_{power}$ is the power density of the internal combustion engine in kW/L.

2. The system as set forth in claim 1, wherein said at least one valve member is further defined as a first valve member and a second valve member, wherein said wall and said valve seat collectively define a valve cavity, wherein said first valve member and said wall of said turbine housing collectively define said first cross-sectional flow area and said valve seat of said turbine housing and at least one of said first and second valve members collectively define said second cross-sectional flow area, and wherein said dual volute turbocharger further comprises,
a valve assembly for controlling exhaust gas flow from said first and second volutes to said turbine housing interior, said valve assembly comprising,
the first valve member engageable with said wall of said turbine housing and disposed about and extending along an axis between a first end adapted to be proximal said wall of said turbine housing and a second end spaced from said first end and adapted to be distal said wall of said turbine housing, with said first valve member movable between a first position where said first valve member is disposed in said valve cavity and adjacent said wall of said turbine housing for restricting exhaust gas from flowing between said first and second volutes, a second position where said first valve member is disposed in said valve cavity and spaced from said wall of said turbine housing for allowing exhaust gas to flow between said first and second volutes, and a third position where said first valve member is disposed outside of said valve cavity for allowing exhaust gas from said first and second volutes to bypass said turbine housing interior,
the second valve member engageable with said valve seat and coupled to said first valve member, with said second valve member movable between a first position where said second valve member is engaged with said valve seat of said turbine housing for restricting exhaust gas from said first and second volutes from bypassing said turbine housing interior, and a second position where said second valve member is disengaged with said valve seat of said turbine housing for allowing exhaust gas from said first and second volutes to bypass said turbine housing interior, and
a valve shaft coupled to at least one of said first and second valve members for moving said first valve member between said first, second, and third positions and said second valve member between said first and second positions.

3. The system as set forth in claim 2, wherein said first valve member defines a valve interior between said first and seconds ends, and wherein said valve assembly further comprises a biasing member disposed in said valve interior, with said biasing member configured to bias said first valve member into one of said first and second positions when said second valve member is in said first position.

4. The system as set forth in claim 2, wherein said first valve member has an outer contour configured to reduce wear of said valve assembly.

5. The system as set forth in claim 4, wherein said outer contour of said first valve member includes a protrusion configured to be engageable with said wall of said turbine housing when said first valve member is in said first position.

6. The system as set forth in claim 3, wherein said second valve member comprises a base coupled to and disposed about said valve shaft and a projection extending from said base and about said valve shaft into said valve interior.

7. The system as set forth in claim 6, wherein said biasing member is disposed about said projection of said second valve member.

8. The system as set forth in claim 6, wherein said second valve member further comprises a lip extending radially from said projection with respect to said axis.

9. The system as set forth in claim 8, wherein said biasing member is disposed between and in contact with said lip of said second valve member and said second end of said first valve member.

10. The system as set forth in claim 2, wherein said valve assembly includes an actuator operably coupled to said valve shaft for moving said valve shaft to move said first valve member between said first, second, and third positions and said second valve member between said first and second positions.

11. The system as set forth in claim 1, wherein said at least one valve member is further defined as a first valve member and a second valve member, wherein said first valve member and said wall of said turbine housing collectively define said first cross-sectional flow area and said second valve member and said valve seat of said turbine housing collectively define said second cross-sectional flow area, and wherein said dual volute turbocharger further comprises,
a first valve assembly for controlling exhaust gas flow between said first and second volutes, said first valve assembly comprising, the first valve member of the first valve assembly engageable with said wall of said turbine housing and disposed about and extending along an axis between a first end adapted to be proximal said wall of said turbine housing and a second end spaced from said first end and adapted to be distal said wall of said turbine housing, with said first valve member of the first valve assembly movable between a first position where said first valve member of the first valve assembly is adjacent said wall of said turbine housing for restricting exhaust gas from flowing between said first and second volutes, and a second position where said first valve member of the first valve assembly is spaced from said wall of said turbine housing for allowing exhaust gas to flow between said first and second volutes, and a first valve shaft coupled to said first valve member of the first valve assembly for moving said first valve member of the first valve assembly between said first and second positions; and a second valve assembly for controlling exhaust gas from said first and second volutes to said turbine housing interior, said second valve assembly comprising, the second valve member of the second valve assembly engageable with a second valve seat, with said second valve member of the second valve assembly movable between a first position where said second valve member of the second valve assembly is engaged with said second valve seat of said turbine housing for restricting exhaust gas from said first and second volutes from bypassing said turbine housing interior, and a second position where said second valve member of the second valve assembly is disengaged with said second valve seat of said turbine housing for allowing exhaust gas from said first and second volutes to bypass said turbine housing interior, and a second valve shaft coupled to said second valve member for moving said second valve member between said first and second positions.

12. The system as set forth in claim 11, wherein at least one of said first and second valve members has an outer contour configured to reduce wear of said first and/or second valve assemblies.

13. The system as set forth in claim 12, wherein said first valve assembly includes a first actuator operably coupled to said first valve shaft for moving said first valve shaft to move said first valve member between said first, and second positions, and wherein said second valve assembly includes a second actuator operably coupled to said second valve shaft for moving said second valve shaft to move said second valve member between said first, and second positions.

14. The system as set forth in claim 1, wherein said controller is adapted to control the at least one valve member to have a $C_{AR}$ operating range from greater than or equal to 0.0000 L/kW to less than or equal to 0.150 L/kW.

15. The system as set forth in claim 1, wherein said controller is adapted to control the at least one valve member to have a $C_{AR}$ operating range of from 0.0001 L/kW to 0.150 L/kW.

16. The system as set forth in claim 2, wherein said controller is adapted to control said first and second valve members to have a $C_{AR}$ operating range from greater than or equal to 0.0000 L/kW to less than or equal to 0.150 L/kW.

17. The system as set forth in claim 2, wherein said controller is adapted to control said first and second valve members to have a $C_{AR}$ operating range of from 0.0001 L/kW to 0.150 L/kW.

18. The system as set forth in claim 11, wherein said controller is adapted to control said first and second valve members to have a $C_{AR}$ operating range from greater than or equal to 0.0000 L/kW to less than or equal to 0.150 L/kW.

19. The system as set forth in claim 11, wherein said controller is adapted to control said first and second valve members to have a $C_{AR}$ operating range of from 0.0001 L/kW to 0.150 L/kW.

20. The system as set forth in claim 1, wherein the controller is further defined as an engine control unit (ECU).

* * * * *